United States Patent [19]

Sedlak

[11] Patent Number: 4,870,681

[45] Date of Patent: Sep. 26, 1989

[54] CRYPTOGRAPHIC METHOD AND CRYPTOGRAPHIC PROCESSOR FOR CARRYING OUT THE METHOD

[76] Inventor: Holger Sedlak, Braunschweiger Strasse 1A, D-3300 Braunschweig, Fed. Rep. of Germany

[21] Appl. No.: 22,970

[22] Filed: Mar. 5, 1987

[30] Foreign Application Priority Data

Mar. 5, 1986 [DE] Fed. Rep. of Germany ....... 3607646

[51] Int. Cl.⁴ ............................................. H04L 9/04
[52] U.S. Cl. ..................................... 380/30; 364/787
[58] Field of Search .................. 380/30; 364/757, 769, 364/787

[56] References Cited

U.S. PATENT DOCUMENTS

| | | | |
|---|---|---|---|
| 3,604,910 | 9/1971 | Kearns | 364/769 |
| 4,041,296 | 8/1977 | Dauby et al. | 364/757 |
| 4,351,982 | 9/1982 | Miller et al. | 380/30 |
| 4,405,829 | 9/1983 | Rivest et al. | 380/30 |
| 4,442,498 | 4/1984 | Rosen | 364/787 |
| 4,567,600 | 1/1986 | Massey et al. | 380/30 |
| 4,625,076 | 11/1986 | Okamoto et al. | 380/30 |
| 4,633,036 | 12/1986 | Hellman et al. | 380/30 |
| 4,658,094 | 4/1987 | Clark | 380/30 |

*Primary Examiner*—Salvatore Cangialosi
*Attorney, Agent, or Firm*—Collard, Roe & Galgano

[57] ABSTRACT

A cryptographic processer and method for utilizing the "public key code" method of Rivest, Shamir, and Adleman ("RSA method"), for enciphering and deciphering messages wherein two large prime numbers, p and q, and a third large number, E are selected and multiplied to form, N=p*q, converting the message to be encrypted into a series of elements $P_i$ preferably of equal length and having numerical values less than that of N, encrypting these elements $P_i$ by raising each to the power E and subsequently reducing modulus N, to give the numbers $C_i = P_i^E$ modulus N, carrying out the above involution step by means of a series of multiplications, performing modulus-reduction operation following the series of multiplications, by carrying out a multiplication in the remainder class ring N, carrying out the aforesaid multiplication by breaking down the operation into individual steps, whereby the multiplication is essentially converted to a series of additions, and carrying out the aforesaid modulus-reduction as a series of subtractions, according to the classical division algorithm, wherein a first look-ahead technique is used for the division and the multiplication is also carried out with a second look-ahead technique.

15 Claims, 17 Drawing Sheets

FIG. 8  Kth CELL BLOCK

HIERARCHIAL CARRY-LOOK-AHEAD ELEMENT

CELL STACKING

CRYPTOGRAPHIC METHOD AND CRYPTOGRAPHIC PROCESSOR FOR CARRYING OUT THE METHOD

This invention relates to a cryptographic processor and method of operation for the encryption and decryption of data according to the "public key code" method of Rivest, Shamir, and Adleman ("RSA method"), for enciphering and deciphering messages by selecting two large prime numbers, and a third large number, forming the product of the prime numbers, converting the message to be encrypted into a series of elements, preferably of equal length and having numerical values less than that of the product of the prime numbers, encrypting these elements by raising them to the power of the third large number, and subsequently reducing the results by a series of multiplications, and breaking down the multiplications into a series of additions and subtractions using an algorithm.

BACKGROUND OF THE INVENTION

With the continually wider use of electronic methods of communication and information storage, secrecy has become an imperative requirement, particularly for important documents such as bank statements, contracts, and the like. While the problem of data protection has received some legislative attention, the technical problems of protecting data to be transmitted have not been satisfactorily solved. Radio transmission or broad band cable transmission of secret data is currently more or less public, and exposed to interception. Currently, there is not any guarantee that secret data can be kept confidential when transmitted. Technical means currently in use do not protect against the decoding of secret data when the data is transmitted by radio or wire. The user must adopt his own steps to ensure confidentiality, such as by ensuring the authenticity of the sender, and protecting against manipulation of the message.

To ensure security therefore, it is important that the information to be transmitted (data, texts, etc.), be converted to a form which cannot be decrypted by an unauthorized person. It has also been found that in general, that the more complex the operations underlying a cipher, the more secure it is.

In classical encryption techniques, symmetrical methods are employed wherein the keys for encryption and decryption are similar, i.e. are identical or inverted. As long as the key is kept secret, the encrypted message can be publicly transmitted. However, in order to decrypt the message, the recipient must be supplied with the secret key by means of a confidential channel, such as a courier. The transmission of a secret key is inconvenient and time-consuming, particularly if one confidential message is broadcast to a number of recipients. Certainly in the electronic age, it is anachronistic to employ couriers or the like to transmit secret keys.

Against this background, ciphers by so-called "public key code" methods have been received as a major advance. Such methods are characterized by an asymmetric key. This means that two different keys are used, one for encrypting and the second for decrypting. With the asymmetric method, one key cannot be determined from the other without additional information. Therefore one of the two keys may be publicized without hazard. It is for this reason that this method has been designated as "public key code".

If a user of the public network exchanges messages with other subscribers by means of the "public key code" method, he must first produce two keys, E and D. By means of a public register, the key E is made available to all other users for encryption, but the decryption key D is kept secret. With many of these methods, the general computation algorithms for encoding are publicized, but doing so does not endanger the secrecy of the contents of the encrypted messages. In addition, the authenticity of the message is not a problem. The security of the asymmetric method rests on the fact that it is practically impossible to compute D from E.

A person who wishes to send a message to another user obtains the key E from the public register, and uses it to encrypt the message. The resulting code is transmitted over an insecure network (possibly digital), e.g. the public telephone network. The recipient decrypts the code received, by means of his secret key D, thereby generating the original message. Thus, a secure channel is not needed to transmit one of the keys, nor to transmit the message itself. The recipient only receives messages which have been encrypted with his own key. The only thing which he needs to obtain independently is the special key D.

Thus by this technique, the main body of the keys are readily available, and the user is relieved from the burden of managing a massive personal key register. Management, i.e., data entry of the keys occurs only once, and this is located centrally in a register which is accessible to all users, a register which is in the nature of an electronic telephone book or an electronic bulletin board This "public key code" transmission procedure can be employed to make any type of transmission network such as ISDN secure.

The above-described embodiment of a "public key code" method still does not authenticate the sender or protect against tampering with the message. In principle it is possible to transmit a digital "signature" which cannot be counterfeited, particularly if the sequence of application of keys D and E is permutable. Then the sender can generate a signature which is transmitted with the encrypted message. This signature is an "extract" of the message, and the extract is encrypted with the secret key D used as a sender key. To test the authenticity of the sender, the recipient generates the extract from the reconstructed message, decrypts the signature with the public sender key E, and compares the two. If they are identical, the message must be from the identified sender, because only the sender and not an impostor knows the key D which matches the sender key E, with which key D the signature was encrypted.

The signature also protects the message against tampering. Moreover, the sender cannot disavow or dispute the message, because the recipient is in possession of a signature in the message. Likewise, the recipient cannot alter the message, because he cannot generate a signature for the counterfeit message. The reason is that the signature, on account of the extract, depends not only on the identity of the sender but also on the message itself. Therefore a higher degree of protection is afforded than with a signature on an ordinary document.

The well-known "public key code" method is called the "RSA" method in honor of its inventors, Rivest, Shamir, and Adleman. The security of the RSA method is based on the fact that it is practically impossible to factor large numbers (e.g., of 200 decimal places), to find all the prime numbers into which the large numbers can be divided without remainders.

The RSA method operates as follows: First, each user of the RSA system selects two large prime numbers, p and q, and a third large number, E (not identical to the key E mentioned earlier). The numbers can be generated by a random number generator of a computer. Algorithms are available to verify that a given number is a prime number (see, e.g., Pomerance, C. (Univ. of Georgia, [U.S.A.]), 1981, "Recent developments in primality testing", in "The Mathematical Intelligencer," Vol. 3, Nr. 3, pp. 97–104).

The RSA method does not prescribe a minimum length for the prime numbers. Small numbers make the algorithms faster, but increase the risk that the product of the prime numbers can be factored. The inverse is true of large numbers. In general, 100 decimal digits is regarded as a good compromise. Let N be the product of the primes p and q. The pair (E, N) is the public key, while the primes p and q are known only to the recipient of a message.

To encrypt the message, the sender first converts his text into a sequence of decimal numbers. This sequence is then divided into elements $P_i$ of equal length i.e., each element having an equal number of decimal digits, with $P_i < N$. These elements are then individually encrypted by raising them to the Eth power and forming modulus N. Thus the numbers $$C_i = P_i^E \text{ modulus } N$$

are generated, which are then transmitted over an insecure channel. To evaluate the numbers, one calculates their exponents modulus $\phi(N)$, where $$\phi(N) = (p-1)(q-1).$$

Since only the recipient knows the primes p and q, only he can compute the key $$D = E^{-1} \text{ modulus } \phi(N).$$

The recipient raises each received number $C_i$ to the Dth power and reduces modulus N. Since $$C_i^D \text{ modulus } N = P_i^{ED} \text{ modulus } N, \text{ and}$$

$$ED \text{ modulus } \phi(N) = 1,$$

the operation $$P_i^{ED} \text{ modulus } N$$

regenerates the original number fragments of the text.

The classical encryption method and the "public key code" methods all have major drawbacks. Both the software and the hardware involved in implementing the prior art methods have proven impractical due to very high costs.

With the current state of chip development, it is not possible to program a general purpose computer with the RSA algorithm (on the basis of 200 decimal digits) to yield acceptable encryption speeds and rates. Also, the RSA function (involution followed by modulus reduction) cannot be carried out directly in a VLSI (Very Large Scale Integration) layout, because there are no direct involution circuits. Thus, for many years it has been desirable to have special hardware which will break down involution into individual steps such that sufficient speeds and rates of encryption are possible.

Nonetheless, currently known implementations of the "public key code" method require a great deal of computing time. Software developed for general purpose computers has encryption and decryption rates of only 10–20 bit/sec. Even the best of the known hardware solutions delivers not more than 1,200 bit/sec. The only single chip solution achieved thus far was developed by Rivest (Rivest, R. L., (Laboratory for Computer Science, MIT), 1980, "A description of a single-chip implementation of the RSA cipher", in LAMBDA Magazine 1, 3:14–18). With this proposal, a relatively simple design was chosen wherein a 512-bit wide arithmetic logic unit (ALU) was constructed using an ordinary arithmetic logic elementary cell. The structure of this ALU allowed it to carry out a very wide variety of operations. The redundancy employed resulted in an encryption rate of 1,200 bit/sec, using a 4-micron NMOS technology. Extrapolated to a 2-micron CMOS technology, an encryption rate of in the range of 2,500 bit/sec could be achieved with a key length of 660 bits using the same general approach.

However, from a practical standpoint this solution is still unacceptable, because system interfaces in the data networks operate at very high data rates. For example ISDN interfaces operate at 64 kbit/sec.

A cryptography processor has been proposed which is comprised of two chips and which can be used for processing 336-bit long numbers employed in the RSA algorithm (see Rieden, R. F., Snyder, J. B., Widman, R. J., and Barnard, W. J., 1982, "A two-chip Implementation of the RSA Public-Key Encryption Algorithm", in "Digest of papers for the 1982 Government Microcircuit Applications Conference", Nov. 1982, pp. 24–27).

The fastest known RSA processor is that disclosed with the proposal of NEC/Miyaguchi (Miyaguchi, S., [1982],"is converted to Fast Encryption Algorithm for the RSA Cryptographie System", in "Proceedings COMPCON 82"). It operates with 8 bits of the multiplier per cycle, and thereby reaches a speed of 29,000 bit/sec. However, since for practical application it requires the high number of 333 chips, it is obviously economically impractical.

A general disadvantage of multi-chip implementations is not only the increase in hardware costs which increases proportionally to the number of chips required, but also the decrease in security. If the signals passing from one chip to another are accessible, then the secret code can be broken with the aid of the transferred signals. Therefore, it is crucial from the standpoint of cryptographic security that all cryptography algorithms be protected by a single chip, via a secure mode of housing the chip.

In German Patent No. 3,228,018, a key system for RSA cryptography is described which also requires a major hardware commitment. In comparison to the original RSA algorithm, with the known key system i.e. the system proposed in the Ger. Pat. No. 3,228,018, encryption rates are only increased by a factor of 4, a modest improvement. To achieve the improvement, a fixed number of bits, namely 4 bits, are processed simultaneously, requiring a plurality of multipliers. A total of 14 adders are also used.

Theoretically, it is conceivable that the processor for the key system of Ger. Pat. No. 3,228,018 achieves a speed four times that of the direct use of the original RSA algorithm. However, the signal paths are much longer than with single bit processing, in which a single bit is read at a time, and therefore in practice very little speed advantage can be expected.

A universal chip with 100 fold computation density also would not be able to carry out the known RSA algorithm with a speed improvement, for reasons other than its raw bit processing rate. Accordingly, the only candidate to achieve rate improvements, if any, would be a special cryptography chip. In any event, substantial cooling problems would be presented, because in such a highly specialized chip, all the transistor functions would be in operation almost constantly, in contrast to the situation with a universal chip. This would be accompanied by substantial power dissipation, resulting in a 100 fold increase in dissipation density over the dissipation density experienced for general computing with a universal chip.

The cooling problem would therefore be substantial, as indicated by the costly proposal in Ger. Pat. No. 3,228,018, whereby cooling is performed by passing a noble gas through channels in the silicon chip. Without adequate cooling, the service life of the chip would be shortened substantially, and the error rate in the cryptography operations would be increased. Furthermore, the universal chip with high computation density would have to be of such excessive size as to defeat its practical implementation.

SUMMARY OF THE INVENTION

Accordingly, it is an object of the present invention to provide a cryptographic method which, with adequate security, enables a calculation speed which is sufficiently fast so that the known RSA method can be utilized.

A further object of the present invention is to devise a cryptographic processor for carrying out the inventive method, which enables the formulated criteria to be met while having a structure which is compact and convenient, with compact chip dimensions.

Accordingly, the invention provides a cryptographic processor and method of operation for the encryption and decryption of data according to the "public key code" method of Rivest, Shamir, and Adleman ("RSA method"), for enciphering and deciphering messages by selecting two large prime numbers, and a third large number, forming the product of the prime numbers, converting the message to be encrypted into a series of elements, preferably of equal length and having numerical values less than that of the product of the prime numbers, encrypting these elements by raising them to the power of the third large number, and subsequently reducing the results by a series of arithematic operations using an algorithm, wherein the criteria for a digital network interface for an ISDN (Integrated services Digital Network) network are met.

An essential concept of the invention is the novel use of a look-ahead algorithm for the division. This step enables a look-ahead technique to be used also for the multiplication step. Therefore for multiple-bit processing, only simple additions and subtractions are required, and one may dispense with an additional multiplication. The advantages of the novel method are thus based, in particular, on the fact that the total cryptographic algorithm is successively broken down into smaller steps to such a degree that each calculation step corresponds simply and directly with a hardware structure.

A relatively superficial comparison of the individual operations of the inventive method and the present state of the art is sufficient to illustrate the advantages of the inventive arrangement. By converting the involution algorithm into a series of multiplications after each modulus reduction is carried out, the intermediate results are prevented from reaching astronomic size, as they typically would with involution. (D and E have 200 decimal digits each).

Beyond converting involution to multiplication and modulus reduction, multiplication is broken down into separate steps to convert the multiplication into a series of additions so that the calculation rate can be increased. As a result, less area on the chip is required. The conversion of the modulus reduction into a series of subtractions is accomplished with the same addition logic since a subtraction can be handled as an addition with an opposite sign.

Since the multiplication is carried out in a ring over N, a modulus reduction can be carried out after each addition. In this way, large numbers are avoided and there are substantial savings in calculation time. All the numbers in each step are less than N in magnitude. Thus the maximum register size is reduced in size or length, i.e., the number of decimal digits of N is reduced. This reduces the required chip surface by half.

The advantageous use of look ahead algorithms is of major importance for the cryptographic method, because it enables the maximum number of addition operations which will be required for the multiplication operations to be substantially reduced, and likewise substantially reduces of the maximum number of subtraction operations which will be required for the modulus reduction operations. The use of the inventive look-ahead algorithm for modulus reduction is the first time look-ahead algorithms have been used to increase calculation speed, since the normal use of known look ahead algorithms for multiplication would not, under any circumstances, result in time savings. If the mean reduction of the computation time associated with the modulus reduction operation corresponds to the possible computation time reduction in the case of the multiplication, there is then provided an optimal algorithm which will reduce the computation time by about $\frac{2}{3}$ over known methods. This advantageous time saving is directly connected with the "floating" which will be described in more detail infra. While Z is shifted absolutely, the shifting of N occurs relative to Z, so that the two shift rates are uncoupled from each other.

The final advantage in the series of method steps lies in combining the addition operation from the multiplication with the subtraction operation from the modulus reduction operation, whereby this combination results in a single operation of 3-operand addition. With this tool, the cycle time does not need to be expanded, since the same amount of time is required for the 3-operand addition as for a simple addition. This alone brings about a doubling of the calculation speed.

Time savings are achieved from the advantageous application of mathematical transformations to the individual method steps, and additional improvements are achieved from the inventive architecture of the cryptographic processor. The organization into tree like structures enables the individual elements to simultaneously process a greater amount of information, resulting in a substantial savings in computation time. Using the inventive block structure, the computation time for a 660-bit addition is reduced to that of a 20-bit addition if such 20-bit addition is accomplished with known layouts.

Finally, it should be stated that the inventive cryptographic processor carries out encryption and decryption at a rate of 64 kbits/sec. Also, this applies to the most unfavorable case where the key is given the maximum length of 660 bits.

The advantages achievable with the inventive cryptographic method and/or the corresponding cryptographic processor are quite evident from a comparison of the overall efficiency with that of a software implementation on, e.g., a 16-bit bit slice processor (BSP) specially designed for the encryption task. Currently available BSPs have a clock frequency of 10 MHz. They can add or subtract two 16-bit words per cycle and at the same time shift the result by 1 bit. They do not have a barrel shifter; therefore they must perform the shift operation serially. Under these conditions, look-ahead features would have an adverse effect on processing rate. For a number A of cycles required to carry out an operation, it is assumed that the BSP requires only one cycle for each step in its main loop. This cycle comprises the following (see FIG. 3):

1. Z[i]:=Z[i]+P[i], and
2. Z[i]:=Z[i]+ −N[i], with Z[i]shifted by one bit.

The microprogram of the BSPs can be designed such that the loop reduces to the second step, if the first can be dispensed with on the basis of the test of the corresponding bits in the multiplier. Since the first step has a probability of ½ of having to be performed, the value of A is 1.5. For the comparison, the following then applies:

$$\frac{V_{RSA,KP}}{V_{RSA,allg.}} = \frac{f_{KP}}{f_{BSP}} \cdot \frac{Erw(sz) \cdot L(N) \cdot A}{B} = \frac{30 \text{ MHz}}{10 \text{ MHz}} \cdot$$

$$\frac{2.27 \cdot 660 \cdot 1.5}{16} \simeq 421$$

("allg."=general, and "Erw"=expected value)

The comparison shows that the inventive cryptographic processor has a better processing rate by a factor of more than two orders of magnitude than specialized arrangements of hardware and software. If the RSA algorithm is implemented only by software means, using normal computing hardware, one starts with differences on the order of a factor of 10,000, since the main loop cannot be carried out with anywhere near the efficiency attainable with the inventive method and chip. In comparison with the Rivest processor, the inventive system reduces the encryption time by a factor of 50, despite a key length which is about 30% greater. This siginificant increase in overall efficiency is brought about by a combination of the use of novel processing steps and a special chip architecture.

The inventive cryptographic processor operates as a "co-processor". It has two DMA channels for data I/O and has an 8-bit data bus. The coding unit and the I/O unit operate in parallel. The processor is essentially a "cryptography box", with the encryption and decryption not being subject to outside influence, wherein a signature is generated and wherein the keys need only be transmitted in encrypted form.

Other objects and features of the present invention will become apparent from the following detailed description considered in connection with the accompanying drawings which disclose the embodiments of the invention. It is to be understood that the drawings are designed for the purpose of illustration only, and not as a definition of the limits of the invention.

BRIEF DESCRIPTION OF THE DRAWINGS

In the drawings, wherein similar reference characters denote similar elements throughout the several views FIG. 1a is a flow diagram of an involution algorithm for the encryption or decryption of data by the original RSA method;

FIG. 1b is a flow diagram of an involution algorithm for encrypting or decrypting the same data as in FIG. 1a by the inventive method;

The time complexity of the algorithm is O(L(E)). The underlying concept of the algorithm is to represent the exponent in binary form, i.e. to convert it into a sum of powers of 2. By the rules of involution, the sum in the exponent is converted to a product of powers of the number P which is to be involuted The exponent of the e-th power is either the e-th power of two or zero, depending on whether there is a 1 or a zero in the e-th binary digit of the original exponent. The factors are thus squares and the number 1.

$$pE = p^{\sum_{e=0}^{L(E)-1} E_e * 2^e} = \prod_{e=0}^{L(E)-1} p^{E_e * 2^e} ; E_e \in \{0,1\}$$

$$p^{2^{e+1}} = p^{2*2^e} = (p^{2^e})^2$$

The position of the lowest bit is defined as the zero position. Accordingly, the position of the highest-valued bit is L(E) −1.

The (e+1)-th square can be readily computed by squaring the e-th square. Therefore, it is advantageous to reserve the product for a separate register, C. Then in each step, the contents of register P are squared and re-stored. the (e −1)-th step, the (e −1)-th square was entered into register P.

The initial entry in register C is 1. If there is a 1 in the e-th binary position in the register of the exponent E, then C is multiplied by P in the e-th step and is then re-stored; otherwise C is unchanged. Because up to this time, the register P contains the e-th square, the calculation of the abovementioned product gives P to the E-th power, due to the equivalence. After the last step, the result is in register C.

Figure 1:
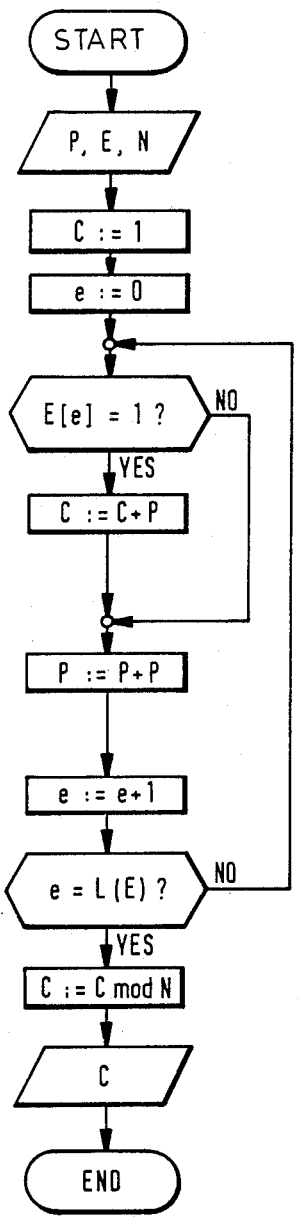
Referring to FIG. 1, there is shown the method steps for the involution. By reducing the operation into simple elementary steps, the involution is broken down into, on the average, $1.5 \times L(E)$ multiplications, where E is the exponent and $L(x)$ is defined as $L(x) :=$ The number of binary digits in x.
Figure 1:
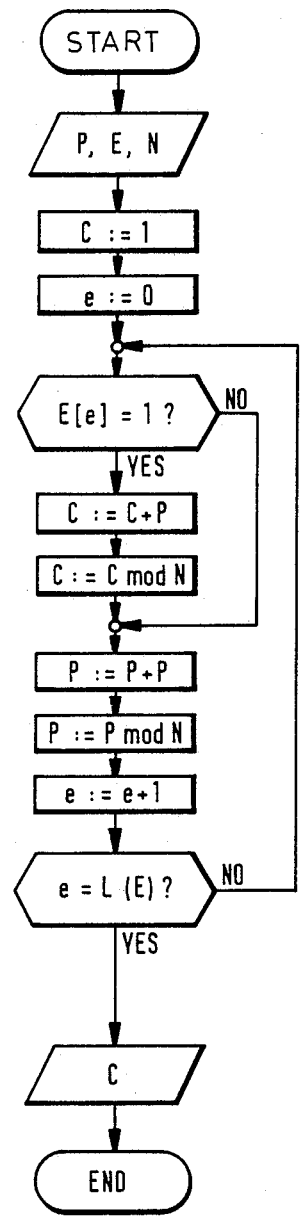

The RSA method illustrated in the flow diagram of FIG. 1a contains the involution algorithm in the top part of the diagram. In the lower part of FIG. 1a, the last step, C mod N, is calculated (i.e., the last step of the RSA algorithm). Because the remainder class arithmetic was dispensed with during the involution, in the event of large numbers, C will have reached an astronomical number of binary digits. The algorithm of the inventive method of FIG. 1b avoids this. It makes use of the congruence rule:

(a mod c) * (b mod c) (a * b) mod c.

The resulting product in each case is reduced by modulus reduction, to give the representant of the remainder class. The representant is the element of the remainder class wherein the representant is also an element of the ring. This element is unique, i.e. there is only one such element in each remainder class which element fulfills the condition.

For the algorithm,
a and b are products from the (e−1)-th step, and
c is the modulus.

The information supplied by the congruence rule shows that the result of the calculation in step e is in the same remainder class;

a) if the products from the (e−1)-th step are reduced to their representants, and then the representants are multiplied together in the e-th step; or
b) if the products from the (e−1)-th step are multiplied together in the e-th step, and then this product is reduced to its representant.

In the algorithm of FIG. 1b, the case (a) is applied to the products in each iteration of the loop. The case (b) is carried out in the algorithm of FIG. 1a, but this occurs only once, namely as the final step of the algorithm. The continual reduction employed in the algorithm of FIG. 1b allows one to plan for, and keep within bounds, the size of the registers employed. The numbers which need to be stored are at maximum, twice the length of the modulus. This maximum need arises in the time interval between the multiplication and the modulus reduction.

The individual steps of the amended algorithm cannot be further broken down on the level of the involution. However, there is no longer any need to do so. An upper bound has been placed on the chip surface required for the involution, due to the continual modulus reduction.

The method steps for the multiplication will now be described, with reference to FIG. 2. In the inventive method, multiplication is carried out by a serial algorithm. The multiplication is broken down into L(M) shift operations and, on the average, 0.5×L(M) additions. In the following, "M" represents the multiplier.

The space requirement on the chip depends linearly on L(M), because for this algorithm of the inventive method, an arithmetic logic unit (ALU) of the size of L(M) is provided, so that the addition is carried out in a single step. The same applies to the shift operation. Therefore, both operations require a constant time to be accomplished. Furthermore, the addition may be performed in parallel with the shift operation. Thus, the following applies, for the time complexity:

$$T_{Mul} = L(M) * max(T_{shift}, T_{add}) = c * L(M).$$

This also depends linearly on the length of M, as does the space requirement. If the required space still exceeds the possibilities of the chip, i.e. if M and therefore L(M) exceeds a certain value, this algorithm can only be used in modified form. Because this problem does not exist with the contemplated size of 660 binary digits (200 decimal digits), the problem will not be discussed further in connection with the present embodiment.

Figure 2:
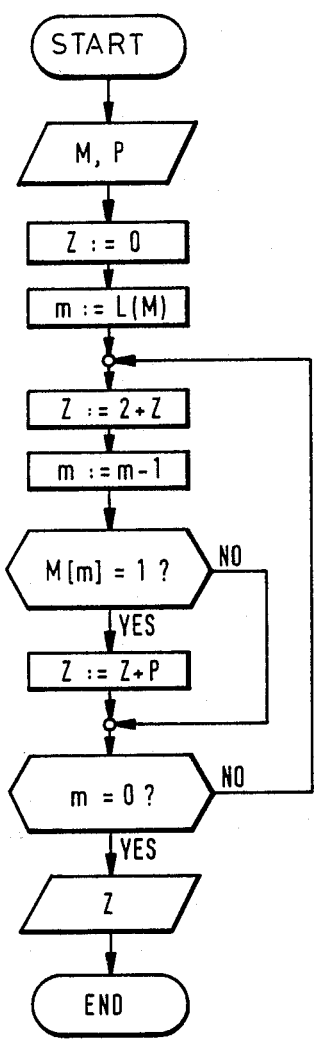
FIG. 2 is a flow diagram of the serial algorithm for the multiplication required in FIG. 1b wherein the multiplicands are integers.

The serial algorithm for multiplication depicted as a flow diagram in FIG. 2 is based on the binary representation of an input parameter. In this respect, it is similar to the above-described algorithm for involution in connection with FIG. 1 Here the multiplier is M:

$$P * M = P + \sum_{m=0}^{L(M)-1} M_m * 2^m = \sum_{m=1}^{L(M)} P * M_{L(M)-m} * 2^{L(M)-m}.$$

The multiplication is broken down into additions. P is added to the intermediate result Z, in step m, if there is a 1 in the (L(M)−m)-th position of the multiplier; otherwise Z is left unchanged. Then the loop is iterated another (L(M)−m) times. As a result of the doubling of Z at the beginning of each iteration of the loop, the sum Z+P at the m-th step has been doubled (L(M)−m) times. This corresponds to, or is equivalent to multiplication with the (i.e. (L(M)−m)-th) power of 2.

To summarize: The algorithm exploits the fact that a multiplication with a binary digit results in either the multiplicand itself, or zero. Furthermore, the algorithm reduces the multiplication by a power of 2, wherein multiplication is required in each step, to a doubling of Z. In binary representation, a doubling amounts to a simple shift operation by one bit leftward since by definition, the lowest valued bit is on the right.

The modulus reduction step is represented in FIG. 3. During the involution, after each multiplication, a modulus reduction operation must be carried out, to obtain a number "representant" from the remainder class ring, wherein the number is congruent to the product. The algorithm described in FIG. 2 treats the two multiplicands as integers and not as elements of the remainder class ring over N. Therefore, in the involution algorithm, a modulus reduction step is carried out after each multiplication.

According to the inventive method, the multiplication is also carried out in this remainder class ring, wherein the usual algorithm has been changed at one juncture: At the end of the loop, the intermediate result Z is reduced to its representant. This is necessary since Z has first been doubled and then P, in the most unfavorable case, has been added to it. Therefore at the end of the loop, Z can have a value which is greater or equal to the modulus N.

If at the end, a further modulus reduction step is inserted, Z, after leaving the loop, will always have a value which is in the permissible value range of the ring. The congruence rule which permits the modulus step from the involution algorithm to be inserted in the multiplication algorithm is:

(a mod c)+(b mod c)=(a+b) mod c.

With involution, as well the congruence rule, the information that the result of the calculation in step m is in the same remainder class and holds true;

a) if the sum from the (m−1)-th step is reduced to its representant, which is then further used in the m-th step; or
b) if in the m-th step, something is added to the sum from the (m−1)-th step and then the resulting sum is reduced to its representant.

Because the multiplication has been converted into a series of additions, the following result holds: Multiplying two numbers followed by modulus reduction is equivalent to modulus reduction after each addition into which the multiplication is broken down.

Figure 3A:
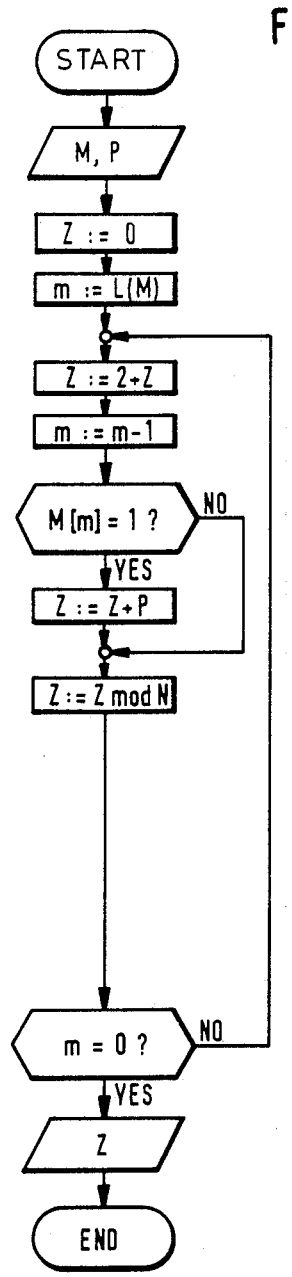
FIG. 3a is a flow diagram of the multiplication algorithm with an added modulus reduction step, wherein the multiplicands are elements of a remainder class ring over N.
Figure 3B:
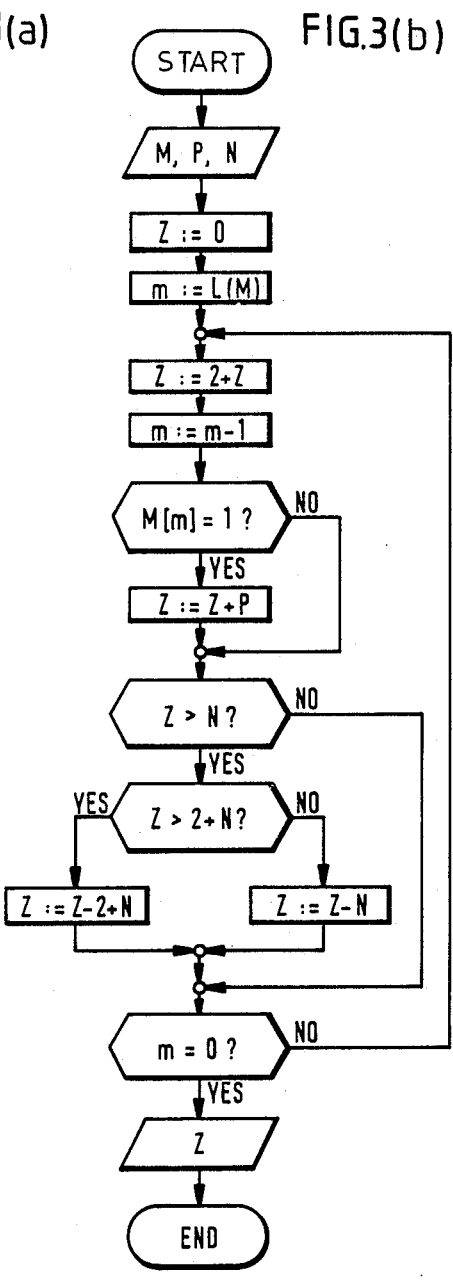
FIG. 3b is a flow diagram according to FIG. 3a wherein the modulus reduction is performed by a subtraction.

The intermediate result Z of the flow diagram of FIG. 3a cannot acquire an arbitrarily high value in the loop if when it first enters the loop, its value is less than N:

$N > Z, P => 3*N > Z :_{TM} = 2*Z + P$.

In the inventive method, the usual modulus reduction is replaced by a single subtraction. If at the end of the loop, Z is equal to or greater than N, then N or 2N is subtracted from Z, whereby Z is again less than N. These steps are contained in the flow diagram of FIG. 3b.

No additional logic is required for the subtraction, because after a minus sign is attached to the subtrahend, the subtraction is converted to an addition, and can be accomplished with the addition logic:

a+b=a+(−b).

A minus sign attachment consists of negating each bit of the number, and finally the number 1 must be added. For each bit this negation is accomplished in the VLSI design layout by one inverter per bit. However, since both items of information are present in the memory cell — the bit and the inverted bit—one may dispense with the additional inverter.

In the addition of two numbers, no carry bit is transferred to the lowest-valued bit. If a subtraction is to be carried out, the negated memory bits are added to the addition logic, and at the same time, a carry bit is signaled to the lowest-valued bits. This method step which connects the multiplication to the modulus reduction in the inventive way will hereinafter be referred to as "mult-mod".

The increased calculation speed by look-ahead techniques can be explained with reference to FIG. 4. If one analyzes the mult-mod algorithm and considers the possibilities for parallelization, one finds that many of the steps can be eliminated. More precisely, entire loop cycles can be eliminated if other than the initial two unavoidable steps, there are no other dependent steps which must be carried out. If one eliminates a cycle, no step in the loop is carried out, not even required steps. This must be taken into account in the next cycle which is not eliminated. First, however, one must calculate how many cycles can be skipped. Let $sz-1$ be the number of cycles skipped ("sz" is the shift amount of the multiplication, and will have this meaning hereinafter). With this information, the first two steps of the skipped cycles can be carried out in the current cycle, along with the other current operations. (sz−1 skipped cycles plus the current cycle gives sz cycles.)

1. Z is shifted leftward, not by 1 bit (doubling) but by sz bits; and
2. m is increased, not by 1, but by sz.

Shifting by sz bits can be accomplished in one step by using a barrel shifter (see Conway, L., and Mead, C., 1980, "Introduction to VLSI Systems", pub. Addison-Wesley Pub. Co., Inc.).

Methods which enable skipping superfluous steps are termed "look-ahead" methods. Such methods must be developed for each algorithm after careful analysis. Most importantly, it must be checked whether the expected time savings are greater than the time for determining the skippable cycles. In the desired hardware implementation of the overall algorithm, there is nothing which detracts from the time savings, because the look-ahead parameter is calculated in parallel with the longest step, the addition step.

A look-ahead algorithm for multiplication has been known for a long time. It has two states:
1. LA=0, indicating that zeros are read over into the multiplier; and
2. LA=1, indicating that ones are read over into the multiplier The sequence of steps in the algorithm is as follows:
1. Set sz := 1.
2. Set m := m +1.
3. Set a := 1 −2* LA
4. The 3-bit string M[L(M)−m...L(M)−m−2] is considered. As long as completion has not been reached, the following operations are carried out, which depend on the 3-bit string and the LA value:

| LA = 0 | LA = 1 | | |
|---|---|---|---|
| 000 | 111 | sz: = sz + 1; | m: = m + 1. |
| 001 | 110 | sz: = sz + 1; | m: = m + 1. |
| 010 | 101 | sz: = sz + 1; | m: = m + 1. |
| 011 | 100 | LA: = 1 − LA; | Completion (II, III) |
| 100 | 011 | | Completion (I, IV) |
| 101 | 010 | | Completion (I, IV) |
| 110 | 001 | Impossible! | |

| 111 | 000 | Impossible! |

5. The following steps are carried out in the mult-mod algorithm:
   a) Shift Z leftward by sz bits; and
   b) Set Z := Z+a*P.

In the Table above, the Roman numerals in parentheses after the remarks "Completion" designate the Rules of the given line of the algorithm (see exposition of the Rules, infra). The first Roman numeral applies in the case of LA=0, and the second in the case of LA=1. The 3-bit strings labeled by "Impossible" cannot occur, because Rules II and III would have to have been applied in the preceding step. The variable a serves only as intermediate storage for the information as to whether or not P is to be given a sign change ("negated") in the addition step. In the inventive implementation, no multiplication takes place in this step, because a can only have the value 1 or −1. (The shifting of Z and the increasing of m have already been discussed supra.)

The look-ahead rules can be easily understood with the aid of the breakdown of the multiplication into sums, namely:

$$P * M = \sum_{m=1}^{L(M)} P * M_{L(M)-m} * 2^{L(M)-m}.$$

In the following calculations, "s" will represent the position relative to $L(M)-m$ in the multiplier at which position (reckoning from the position $L(M)-m-1$) the first bit is not equal to LA.

According to Rule I, if an isolated 1 is present in a string of zeros, then P is to be added to Z at this position. Mathematically stated:

$$\sum_{\lambda=1}^{m+s} P * M_{L(M)-\lambda} * 2^{L(M)-\lambda} = \sum_{\lambda=1}^{m} P * M_{L(M)-\lambda} * 2^{L(M)-\lambda} +$$

$$\sum_{\lambda=m+1}^{m+s} P * M_{L(M)-\lambda} * 2^{L(M)-\lambda}$$

$$= 2^{L(M)-m} * Z + 2^{L(M)-m-s} * P.$$

since the summands of the second sum in the right member are zero except where lambda=m+s, because the binary representation of the multiplier is 00...01 in the positions $L(M)-m-1$ to $L(M)-m-s$.

The simplest way to appreciate Rule II is in interrelation with Rule III. Rule II converts or "switches" from a zero-string to a one-string when at least a second 1 follows the first 1. At the position of the last zero, P is added to Z. Rule III is the dual of Rule II. It converts from a one-string to a zero-string when at least a second zero follows the first zero. At the position of the last 1, P is subtracted from Z. Let s1 be the position of the first 1 and let s0 be the position of the first subsequent zero (both reckoned with respect to m). Then;

$$\sum_{\lambda=1}^{m+s0} P * M_{L(M)-\lambda} * 2^{L(M)-\lambda} = \sum_{\lambda=1}^{m} P * M_{L(M)-\lambda} * 2^{L(M)-\lambda} + \sum_{\lambda=m+1}^{m+s1-1} P * 0 + \sum_{\lambda=m+s1}^{m+s0} P * M_{L(M)-\lambda} * 2^{L(M)-\lambda}$$

$$= 2^{L(M)-m} * Z + 0 + \sum_{\lambda=m+s1}^{m+s0-1} P * 1 * 2^{L(M)-\lambda}$$

$$= 2^{L(M)-m} * Z + 2^{L(M)-(m+s0-1)} * P * \sum_{\lambda=0}^{s0-s1-1} 2^{\lambda}$$

$$= 2^{L(M)-m} * Z + 2^{L(M)-(m+s0-1)} * P * (2^{s0-s1} - 1)$$

$$= 2^{L(M)-m} * Z + (2^{L(M)-(m+(s1-1))} - 2^{L(M)-(m+(s0-1))}) * P$$

Rules II and III follow directly from the last line. The positions between the two conversion points need not be taken account of, provided that they all are 1. An example will serve to illustrate this:

$$3 * 60 = 180$$
$$11 * 00111100 = 10110100$$

$$\hat{m}\ s1\ s0 \quad L(M) = 8, m = 1, s1 = 2, s0 = 6$$
$$L(M) - m - s1 \ldots L(M) - m - s2 + 1 = 5 \ldots 2$$
$$L(M) - m - s1 + 1 = 6$$

$$3 * (32 + 16 + 8 + 4) = 3 * (64 - 4) = 180$$

One can omit two additions and thus two cycles in this example by not processing one bit of the multiplier after another but rather by considering a one-string as a geometric sum, calculating the sum, and passing over the superfluous bits.

There remains Rule IV, which states that if an isolated zero appears in a one-string, then at that position P is subtracted from Z.

$$\sum_{\lambda=1}^{m+s} P * M_{L(M)-\lambda} * 2^{L(M)-\lambda} = \sum_{\lambda=1}^{m} P * M_{L(M)-\lambda} * 2^{L(M)-\lambda} + \sum_{\lambda=m+1}^{m+s} P * M_{L(M)-\lambda} * 2^{L(M)-\lambda}$$

$$= 2^{L(M)-m} * Z * \sum_{\lambda=m+1}^{m=s-1} P * 1 * 2^{L(M)-\lambda} + 0$$

$$= 2^{L(M)-m} * Z + \sum_{\lambda=m+1}^{m=s-1} P * 1 * 2^{L(M)-\lambda} * P * (2^{L(M)-m-s} - 2^{L(M)-m-s})$$

$$= 2^{L(M)-m} * Z + \sum_{\lambda=m+1}^{m+s} P * 1 * 2^{L(M)-\lambda} - P * 2^{L(M)-(m+s)}$$

From the standpoint of the look-ahead method, after the subtraction of P at the position $L(M)-(m+s)$, it appears as if the 1-string is unbroken. The look-ahead can then be continued.

Figure 4:
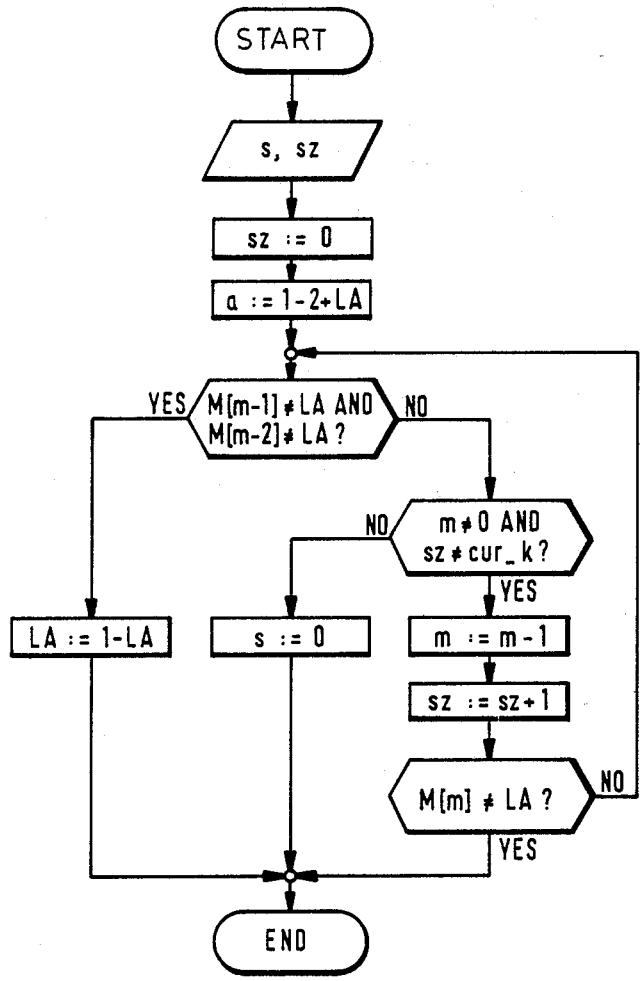
FIG. 4 is a flow diagram of a look-ahead algorithm for the multiplication, wherein the algorithm serially calculates the look-ahead parameter.

With the look-ahead algorithm represented in the flow diagram of FIG. 4, which calculates the parameters serially, no time savings are achieved over the version without look-ahead, because only one bit of the multiplier can be tested per cycle. Therefore this flow diagram serves only to facilitate conversion of the Rules into a functioning algorithm. On the other hand, this algorithm according to FIG. 4, is provided and of direct use for the hardware implementation, wherein in the hardware implementation, the look-ahead parameter is calculated in a step parallel to the operations of other calculations, so that at the end of a cycle, the parameters are immediately ready for the next cycle.

In this algorithm, the shift amount sz can have a maximum value of cur k (where "cur k" is the name of a variable). The shift amount is the specification of the number of places by which a register is shifted. The theory does not furnish a maximum of the shift amount, but a maximum is required in practice. The barrel shifter which shifts Z in one step into the calculated position can do so only up to a maximum shift amount "k", which must be specified in the design. Of course, k is the maximum value which cur k may assume. The value of cur k is determined from the modulus-look-ahead algorithm (which will be developed infra).

If none of the Rules can be applied before sz=cur k, then Z is shifted leftward by k bits, and a is given the value zero, i.e. P is neither added nor subtracted. The work which theoretically can be done in one step must be broken down into multiple steps, from considerations of cost and space. The determination of a value for k which value is an acceptable compromise between the requirements of increased speed and reduction of the required space will be discussed in one of the paragraphs infra.

Figure 5:
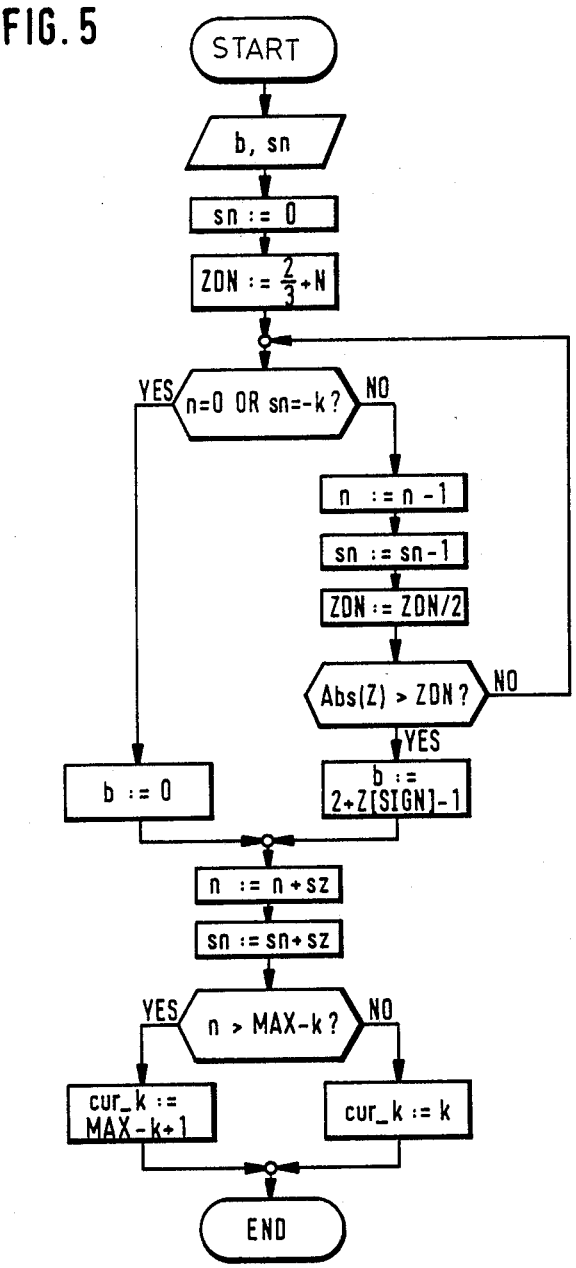
FIG. 5 is a flow diagram of a look-ahead algorithm for the modulus reduction operation, wherein the algorithm serially calculates the look-ahead parameter for the modulus reduction.

The next feature is the look-ahead extension (i.e., extension of the look-ahead technique) to the modulus reduction step (FIG. 5). Since for efficiency, the multiplication was converted into operations in the remainder class ring, there is little use for the improvements in multiplication set forth in the preceding section (supra) involving look-ahead unless a method of generating look-ahead parameters can also be prescribed for the modulus reduction step. Otherwise the modulus step will slow up the entire process, because as always, it can process only one bit per cycle. In addition, the process is subject to a limitation or constraint in adapting it to look-ahead. The expected value of the shift amount per cycle should be approximately the same as with the multiplication algorithm. Otherwise one look-ahead algorithm will slow up the other.

The inventive algorithm which satisfies the conditions imposed, along with the stated rules put in algorithm form, is represented in the flow diagram of FIG. 5. As discussed earlier, this algorithm is depicted serially. In the hardware implementation, however, it has the same properties as the look-ahead algorithm for multiplication.

The basic constraints or "boundary conditions" for the modulus-look-ahead algorithm require that the expected values of both amounts by which the two variables which are to be shifted per cycle coincide. Previously, N was not shifted; in each cycle Z was shifted by one bit leftward, and N was shifted one bit rightward relative to Z—i.e. N maintained its position. Now the present look-ahead method will generate a parameter, sn, which specifies the number of bits N is to be shifted rightward relative to Z. Hereinafter, "sn" is the current shift amount of i.e., employed in the modulus-look-ahead algorithm, and "n" specifies the number of absolute binary positions N has been shifted leftward up to the given time. Accordingly, the register N will contain multiples of the modulus N. Therefore, at the end of the mult-mod loop, Z will usually not be a remainder class "representant". There are three possible cases:

1. sn>sz. N is shifted rightward absolutely by (sn−sz) positions. Care must be taken in advance that n is not less than zero, because if it is, then computations will be made with fragments of N and not multiples of N. This destroys the congruence. Therefore, sn is calculated such that the value of n is not below zero.
2. sn=sz (will not be discussed).
3. sn<sz. N is shifted leftward absolutely by (sz−sn) positions. If there is a possibility that in the next step n will exceed a preset value, "MAX", the multiplication look-ahead algorithm must be trimmed so that n will not in any case exceed MAX. This is how n is prevented from becoming arbitrarily large.

In the algorithm of FIG. 5, it is seen that, at the end, the amount of shift of Z is limited. The value cur k is set up such that in the most unfavorable case (sz=cur k and sn=1) the value of n in the next step is immediately MAX.

A requirement to set up a look-ahead technique for the modulus reduction is, independently of the Rules applied, that calculations can be performed with multiples of N. The advantage is that the multiplication and he modulus reduction generally do not impede each other. They only mutually impede if in the abovementioned case 1 or case 3, the value of sn or sz reaches an upper limit for a step. A disadvantage is that the register must store numbers which are greater than the modulus. In the VLSI design, a buffer must be provided for this overflow.

However, this disadvantage only concerns two registers—Z and N. Furthermore, the buffer size has an upper limit furnished .by MAX. The VLSI design envisioned can thus proceed on the basis of constant sizes of all registers and of the buffer as well. The size which the buffer should have so that the expected values do not fall too low is discussed herein.

At this point, the calculation Rules for the look-ahead parameter have yet to be described. The quantity "ZDN" is required for this purpose. It is defined as $\frac{2}{3}$ the value of register N:

$$ZDN := \tfrac{2}{3} * N.$$

The algorithm is as follows:
1. Set sn:=0.
2. Set b:=0.
3. Carry out the following, if and only if Z≦ZDN:
   (a) Set sn:=sn+1;
   (b) Set n:=n−1 and
   (c) Shift ZDN 1 bit rightward, i.e. divide ZDN by 2.
4. Set b:=2*Z(sign)−1. If the sign bit has the value 0, then Z is positive; otherwise Z is negative.
5. In the mult-mod algorithm, the following is carried out:
   (a) Shift N rightward by sn bits relative to Z; and
   b) Set Z:=Z+b*N, i.e. if Z is positive then N is subtracted from Z, and otherwise N is added to Z.

In the hardware implementation, no multiplication is carried out in the last step, since b can only assume the values −1, 0, and +1; accordingly, −N, 0, or +N is supplied to the addition logic. The calculation of ZDN does not present any difficulties, because ZDN is not newly calculated each time, but is only calculated once with the transmittal of the key, and is then subjected to the same shift operations as N. Therefore the relation between N and ZDN is maintained.

However, ZDN must be calculated after transmission of a key. The binary representation of $\frac{2}{3}$ is 0.1010101 ... . Accordingly, ZDN is calculated as follows:
1. Set Z:=0.
2. Set Z:=Z+N.
3. Shift Z leftward by 2 bits.
4. Go to step (2), if ZDN is still not calculated accurately enough.

The last step contains a vague termination condition. ZDN is accurately determined if each bit of the multiplier has been multiplied by "$\frac{2}{3}$" (i.e. binary decimal 0.1010101 ... ). The number of bits of "$\frac{2}{3}$" which affect the comparison of Z with ZDN is the same as the number of bits in the comparator which carries out the comparison. The width of that comparator is determined by the desired accuracy of the comparison. As demonstrated in the next section infra, 10 bits is more than adequate. Accordingly, ZDN can be calculated in very few steps.

As mentioned, only a relatively small number of the highest valued bits in ZDN are used for comparison with Z. Of course, this causes the comparator to derive and deliver an incorrect result, since in order to achieve a 100% correct comparison, all L(N) bits must be taken into account. However, it is difficult to carry out a complete comparison due to space considerations. Moreover, with complete comparison the comparison time would be similar to the normal addition time. Thus, accurate comparison would be a Pyrrhic victory.

Now what are the consequences when the comparator reaches a false conclusion? In the next cycle sn will have the value 1, instead of >1. Therefore the current shift amount in the next cycle degrades to 1. Proof:

If the comparator has delivered the correct result, sn has been determined such that $$2^{-sn}*\tfrac{2}{3}*N < |Z| \leq 2^{-(sn-1)}*\tfrac{2}{3}*N$$

N is now shifted by sn bits to the right, i.e. is divided by 2 to the power sn. Then, if Z is negative, N is added to Z; otherwise N is subtracted from Z. Thus it follows that N is subtracted from the absolute value of Z. The result is re-stored in Z.

$$\tfrac{2}{3}*N - N < |Z| - N \leq \tfrac{4}{3}*N - N$$

$$\tfrac{-1}{3}*N \leq Z' \leq \tfrac{1}{3}*N$$

$$0 => |Z'| \leq \tfrac{1}{3}*N.$$

Because abs(Z) N/3, in the next cycle sn must be greater than 1.

$$|Z| \leq \tfrac{1}{3}*N <=> |Z| \leq 2^{-1}*\tfrac{2}{3}*N = 2^{-1}*ZDN => sn > 1. \quad (2)$$

This proves part 2.

However, if the comparator makes a wrong decision, the inequality (1) is not satisfied. For example, a wrong decision will be made if, by roundoff error in the computation, ZDN has become somewhat smaller than 2N/3. If Z is close to but still less than 2N/3, the comparator will yield the result that ZDN Z, when in fact this result should await the next bit position. Consequently, $$|Z| < \tfrac{2}{3}*N$$

$$Z' = |Z| - N < \tfrac{2}{3}*N - N = -N/3$$

$$=> |Z'| > N/3$$

The assumption (1) no longer applies. Instead, $$|Z| > \tfrac{1}{3}*N <=> |Z| > 2^{-1}*\tfrac{2}{3}*N = 2^{-1}*ZDN = <sn=1. \quad q.e.d$$

Therefore the effects of an error in the comparator are relatively harmless. This gives the design engineer wide latitude in the choice of the width of the comparator, because a small width and the consequent erroneous comparisons only increase the number of cycles. They do not cause an error in the calculation. Therefore a comparator of small width may be designed, which of course will make frequent errors, but which nevertheless will save time due to the result being available very rapidly.

In order to exercise the judgment involved in setting the comparator width, the error probability must be known. An error arises either through a roundoff of the last bit of ZDN or through bits which are of lower value than the lowest valued comparator bit. Let "d" be the comparator width. Then the error frequency e ("epsilon") is given by:

$$e: = P(\text{error}) \leq \tfrac{1}{2^d}$$

(where "P" stands for "probability"). What this expression says is that an error can only occur if none of the high valued bits can determine the decision This happens with one out of $2^d$ numbers.

Since only the probability-theoretical expected values of the two look-ahead methods for multiplication and for modulus reduction correspond, they are necessarily uncoupled from each other in the mult-mod algorithm. In this connection, in each cycle, Z is shifted absolutely and N is shifted relative to Z. This uncoupling is herein called "floating", and will be discussed further in connection with FIG. 15.

Figure 15:
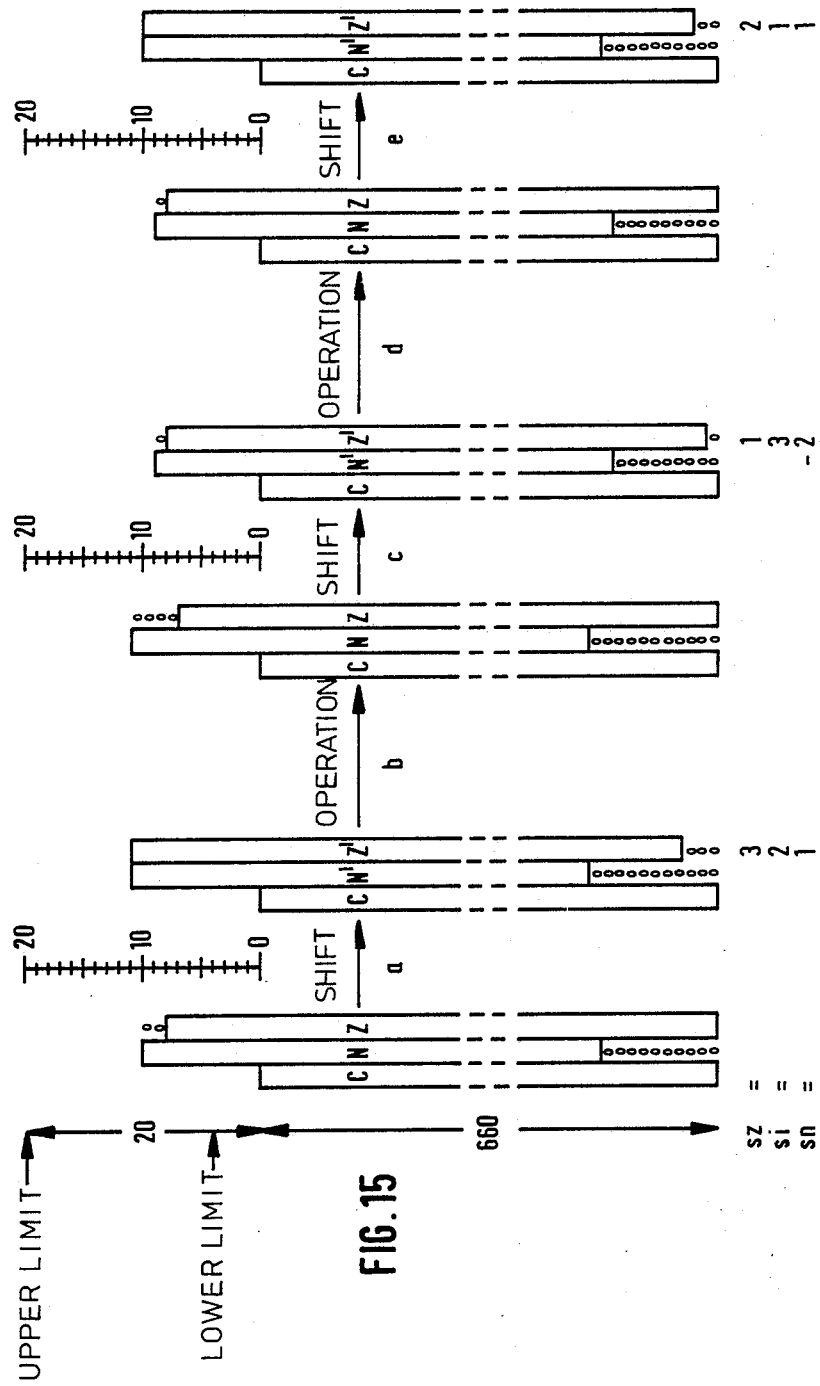
FIG. 15 is a diagram showing several step sequences of the topmost 20-cell block configured as a buffer in FIG. 10.

The instantaneous state of the cryptographic processor represented by steps a through e in FIG. 15. The transitions a, c, and e represent shifts, while b and d represent additions or subtractions, which additions and subtractions will not be discussed further here. The bars represent the registers C (14), N (18), and Z (20, 22, 24; register of the cryptographic processor). (Numbers in parentheses are the general reference numerals adopted.) The height of the bars represents 660 bits+20 bits. 660 bits is the maximum word length, and 20 bits is the size of a buffer which enables the uncoupling.

If, for example, the shift amount or magnitude of the shifting for the multiplication is greater than the shift amount for the modulus reduction, the register N is shifted upward by the difference in the shift amounts (see steps a and e); thus some of the topmost bits of register N are forced into the buffer.

In the opposite case, N is shifted downward (step c). Controls to ensure that N is not moved beyond the buffer limits are discussed herein.

Suppose that, before step a, N has already been shifted by 10 bits into the buffer. The shift amount sz, in the present example, subsequently takes on the successive values 3, 1, and 2, as displayed at the bottom of FIG. 15. The shift amount si, which represents the value of the shift of Z relative to N, takes on the successive values 2, 3, and 1, which signifies that the absolute shift of N, which is sn=sz−si, was successively 1, −2, and 1. Following steps a, c, and e, N has been shifted into the buffer to the extent of 11, 9, and 10 bits, respectively. This process illustrates what was designated earlier as "floating".

In step c, the effect of the look-ahead limit k is illustrated, for the case k=3. Although the algorithm would be capable of carrying out a shift of 4 for si, N is shifted only 3 bits relative to Z, and then another 1 bit in step e. Thus, in step d, N is neither added to or subtracted from Z. This means that the sign b in FIG. 5 took on the value "0".

Figure 6A:
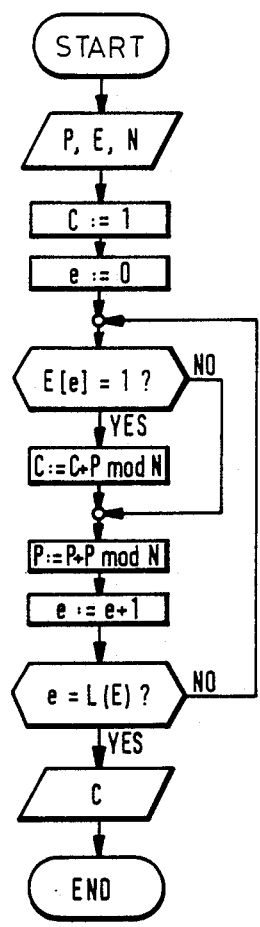
FIG. 6a is a flow diagram according to FIG. 1b wherein the multiplication and subsequent modulus reduction are combined into a single "mult-mod" step.
Figure 6B:
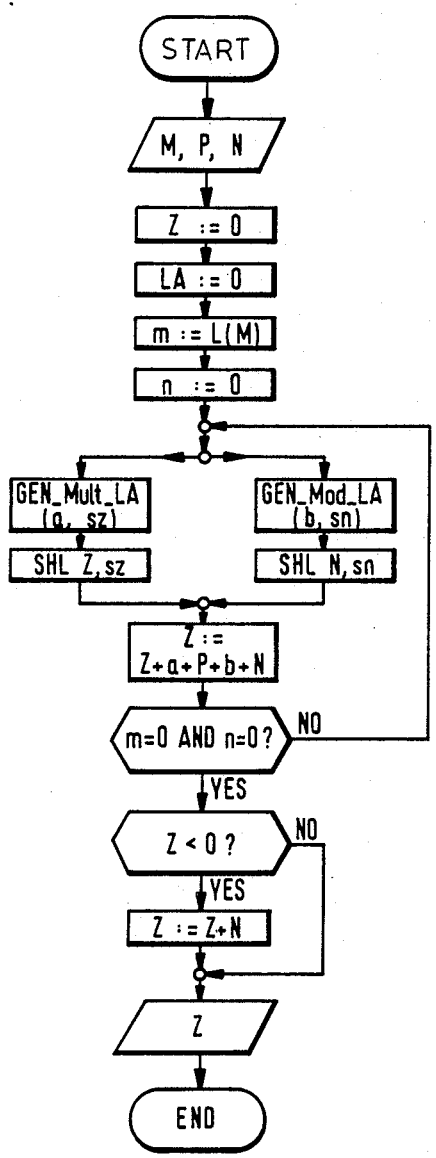
FIG. 6b is a flow diagram of the inventive mult-mod method used in FIG. 6a, wherein the method is implemented with the look-ahead parameter.

In the following, the method step of 3-operand addition will be described. FIG. 6 provides a comparison between the complete RSA method (FIG. 6a) and the complete exemplary embodiment of the inventive cryptographic method (FIG. 6b).

Here, the queries which were still contained in the last version of the mult-mod algorithm (FIG. 3) are replaced by the calling of the two look-ahead algorithms. The calculations of the look-ahead parameters are carried out in parallel. This is indicated by the parallel branches in which the subroutines are depicted.

In this version of the algorithm, a negative value can be stored in Z after the loop has been executed. Therefore, in the mult-mod algorithm with look-ahead, a result correction must be carried out at the conclusion. If Z is negative, then Z+N is positive. This additional step is contained in the flow diagram of FIG. 6b.

The multiplication step and the modulus-reduction step are combined into a single step, the 3-operand addition. The logic adds not two but three operands simultaneously in each step, as seen in the following:

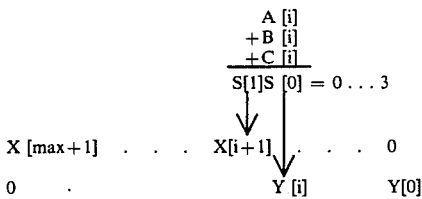

The 3-operand addition is divided into two segments. In the first segment, at each binary position, a sum of the three bits of the respective operands A, B, and C is formed. The value of the sum of A[i], B[i], and C[i] can be 0, 1, 2, or 3; thus it is representable in binary form by the two bits S[1] and S[0]. Because the sum is formed at each position, two numbers (X, Y) can be assembled from the two sum bits:

Y[i]:=S[0], Y[max+1]:=0 and

X[i+1]:=S[1], X[0]:=0 where i=0, ..., max. In the second segment, the two numbers are added in normal fashion. There is no problem with the extra bit of length, because the result is shorter than the longest operand by at least one bit.

In order to avoid excessive energy consumption in the addition logic, the pullup transistors have been omitted at a number of locations. Thus, the logic is in a metastable state. If the adding then upsets it into a stabile state, it cannot now automatically leave this state. Therefore, at the end of a cycle, the logic must be returned to the metastable initial state, by means of an external precharge signal. During this period, the bit addition is loaded.

The Cryptographic Processor

This second part of the specification of the invention relates to the block circuit diagram, and the floor plan of the processor resulting therefrom. In the invention, it is important to devise the structure of a specialized elementary cell 10 which optimally supports the RSA algorithm. The block circuit diagram of the processor was set up to correspond with this structure. The circuit diagram contains sufficient information to enable one to devise a corresponding floor plan for the processor.

In order to efficiently support the RSA algorithm, the individual steps of the algorithm must be examined first, to determine whether they are carried out infrequently and/or consume little time, or whether the opposite is true. In the first case, (low frequency and/or high speed) it is more rational to carry out the steps via a microprogram. However, in the time-critical (i.e., overall rate-limiting) steps, a hardware implementation must be made in the elementary cell. The following steps are carried out on the level of the RSA algorithm (see the flow diagram of FIG. 6):

1. Initialization. The variables C and e are assigned their initial values.

2. The loop. The loop contains two queries and resulting routings, two calls of the mult-mod algorithm, and incrementation of the variable e.

Figure 11:
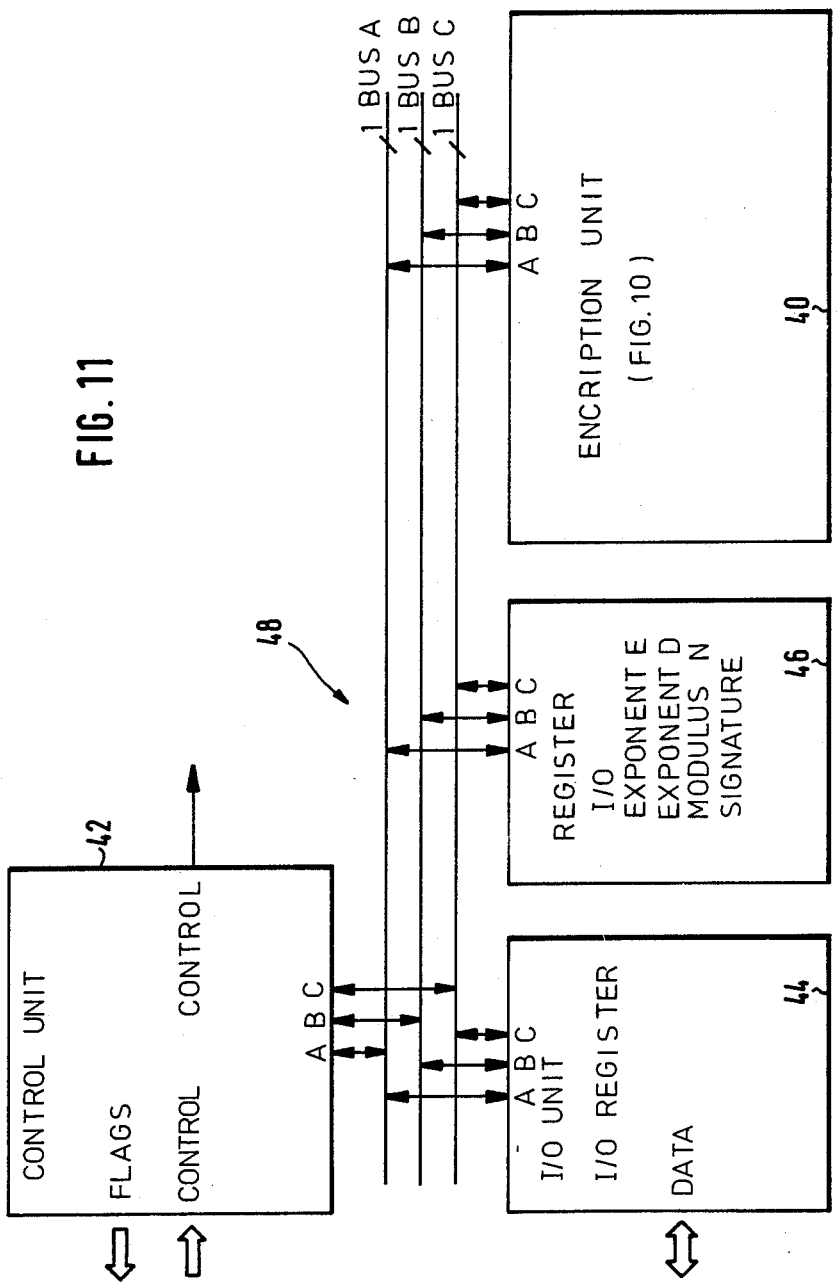
FIG. 11 is the block circuit diagram of a cryptographic processor.

Each of the listed steps is either carried out only once during the calculation, or else the operation is limited to a few bits, e.g. binary query of an exponent bit. Further, the limited operations are simple and therefore consume very little calculation time. The steps are thus accomplished via a microprogram. The problem is solved with a simple control unit 42 (see FIG. 11).

The variables which are designated by a lower case letter all have a counting function. They operate closely with the control unit 42, the decisions of which depend on the counting variables. Conversely, the values of the counting variables are incremented (or decremented) based on decisions made by the control unit. Therefore the registers of the counting variables must be placed in close proximity to the control unit. This is possible, because their length is 1 d(L(M)) bits, where 1 d stands for logarithmus dualis (i.e, logarithm to the base 2). For a key length of 660 bits, they are 10 bits long.

The same considerations apply for the queries and the counting variables of the mult-mod algorithm. In any event, the tasks in question are carried out by a separate, distinct control unit 36 (see FIG. 10), because the calculation of the look-ahead parameter is very critical in view of the course of the mult-mod calculation. The timely generation of the shift amounts sz and sn, and the information as to whether, and with what signs, P and N are to be included in the 3-operand addition, have major effects on the cycle time.

These control units do not govern the operations which are carried out with the numbers having length L(N) bits. An elementary cell, (see FIG. 7) was designed to store such numbers in close proximity to the operative logic, and to contain or embody the logic itself.

Figure 7:
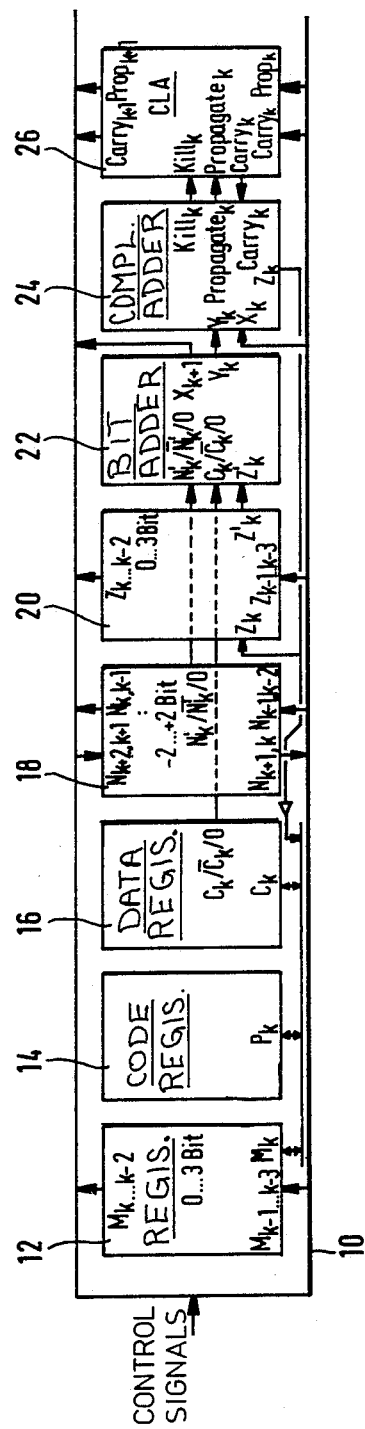
FIG. 7 shows an elementary cell for carrying out a mult-mod loop in a single step.

The necessary registers and the logic for the elementary cell 10 are seen in FIG. 7. Elementary cell 10 of FIG. 7 comprises a register 12 which contains a multiplier M, and further comprises a code register 14, and a data register 16. There follows a UD-shift register 18 (UD =up/down) which contains N and shifts it by between −2 and +2 bits. Other components of elementary cell 10 are a barrel shifter 20, a bit adder 22, and a complete adder 24, followed by a carry-look-ahead element 26.

In the RSA algorithm or the mult-mod algorithm, a total of 5 registers is required:
1. Register 12 is for the instantaneous multiplier M. The length of this register is L(N).
2. Register 14 is for the encrypted datum'. During the calculation, this register contains the variable C, the value of which represents the result of the encryption (following the completion of the RSA algorithm). The length of this register is L(N).
3. Register 16 is for the data to be encrypted. During the calculation, this register contains the variable P, which at the beginning of the RSA algorithm is assigned the value of the data to be encrypted. The length of this register is L(N).
4. Register 18 is for the modulus N. During the calculation, this register contains a multiple of the modulus. Therefore, the length of this register is

L(N)+MAX.

This register has, in addition to its storage function, the capability of shifting the variable N by a plurality of positions in a single step. In each cycle, N is shifted rightward relative to Z by sn positions. At the same time, Z is shifted leftward by sz positions; i.e., N is shifted rightward absolutely by sn−sz positions. The values of sz and sn can be 1, 2, or 3 (since the maximum look-ahead, k, has been set at 3). The absolute shift amount by which N is shifted rightward thus takes integer values from −2 to 2. A negative rightward shift amount signifies that N is shifted leftward. Similarly to an LR (left/right) shift register, the UD-shift register 18 (an up/down shift register) provides the required capability of shifting in either direction by 1 bit, for each half cycle (or 2 bits for each full cycle).
5. The register Z (comprising 20, 22, and 24) is for the intermediate result Z of the mult-mod algorithm. This register is read at the beginning of each cycle, and the new intermediate result is written in it at the end of each cycle. Thus, the register must store the variable Z for only a short time. The simplest way to accomplish this is by dynamic storage of each bit of Z on the input gate of an inverter. The length of the register is L(N)+MAX, since this is the length of register 18, and Z can take the value of register 18. Register Z is considered to be a component of the full adder 24.

The first three registers (12, 14, 16) are designed as static memory, since they must store information over relatively long time intervals.

In addition to the abovementioned registers, the elementary cell design has the following components:
1. A barrel shifter 20, is capable of shifting the result of the addition, namely the intermediate result Z, by 0 to 3 bits. It is necessary that a 0-bit shift be included in the capability of the barrel shifter, since the multiplication is completed before the modulus reduction is completed, and then Z no longer needs to be shifted.
2. A bit adder 22 is provided without a carry bit. This converts the 3 operand bits into a sum which can be represented with two bits.
3. A full adder 24 is provided. This is the name for a 2-bit adder which processes the carry bit of the next lower position and generates a carry bit for the next higher position.

The multiplication of the present embodiment will be described as follows: The addition logic has reading access to registers 16, 18 and 20, 22, 24, and can store a number in each register. P (register 16) is one of the two factors in each call of the mult-mod subroutine in the RSA algorithm. If P is always selected as the multiplicand, and the other factor as the multiplier, then it is sufficient if the elementary cell logic reads only registers 16, 18, and Z (Z being 20, 22, and 24), in order to be able to perform the required shift operations and the 3-operand addition.

The mult-mod control unit 36 (FIG. 10) solves the detailed problem of generating the look-ahead parameter. Accordingly, multiplier M in register 12 is shifted parallel to register Z. The mult-mod control unit 36 has access to the topmost bits of register 12 (see FIG. 12). Depending on these bits, the mult-mod control unit 36 generates the shift parameter sz, which however is not output directly but is converted into appropriate control signals. These processes are carried out in FIG. 12 in the multiplication shift logic 50.

Similarly, the shift parameter sn is generated in the modulus-reduction shift logic 52. A comparator 38 compares the upper bits of sz with N/3, N/6, N/12, etc. Corresponding to the algorithm of FIG. 5, the result of the comparison is fed to the modulus-reduction shift logic 52. This value specifies the amount by which the register 18 is shifted rightward relative to Z. From this relative shift amount or value, and the shift amount of the multiplication shift logic 50, the modulus-reduction shift logic 52 generates the absolute shift parameter sn. Again, sn is not output per se, but is similarly converted into appropriate control signals.

Figure 12:
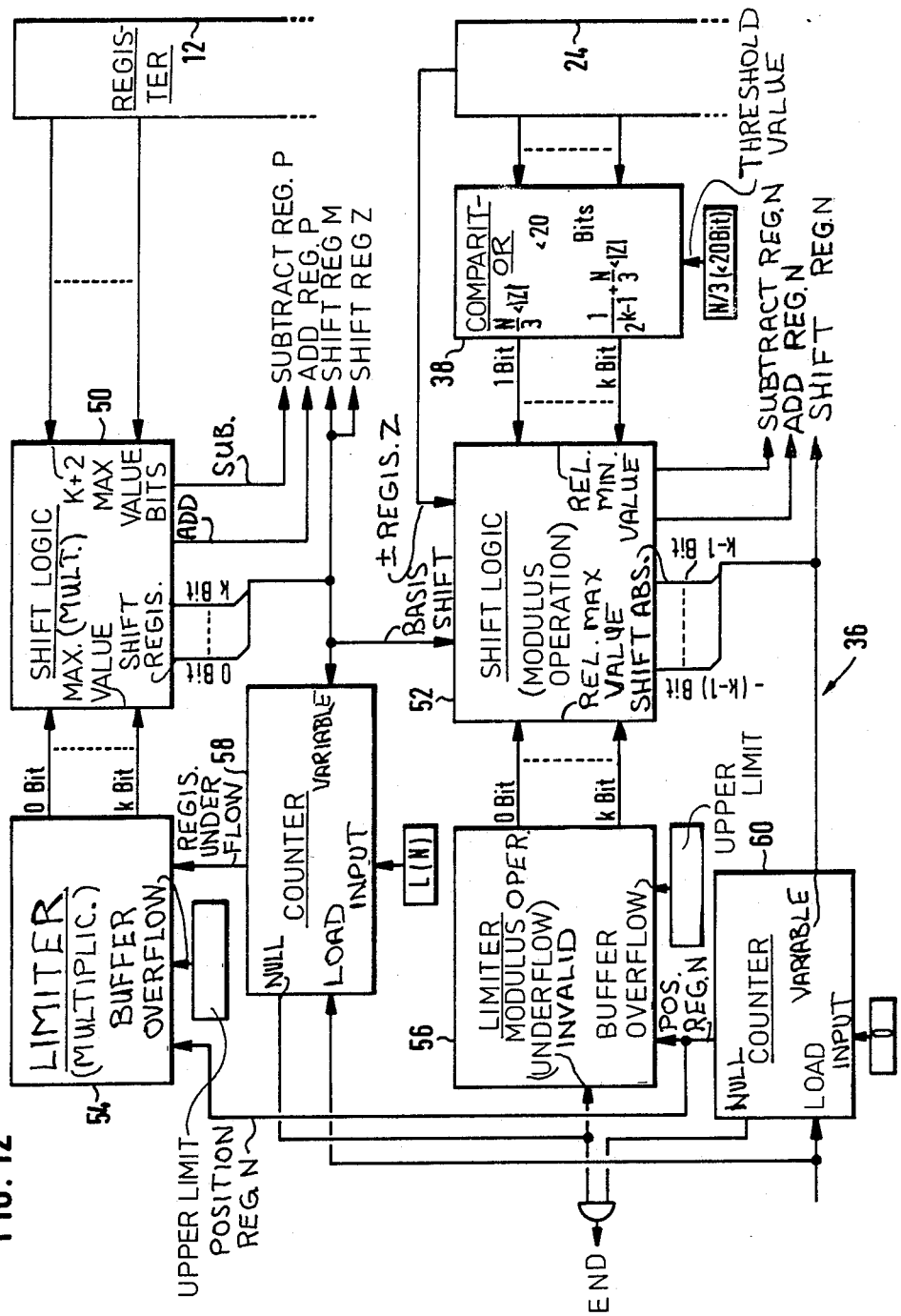
FIG. 12 is a circuit block diagram of a control unit according to FIG. 10, based on the setting of the parameters of the look-ahead algorithms according to FIGS. 4 and 5.

The limiters 54, 56 shown in FIG. 12 have the function of limiting the shift amount sz or sn in the event register 18 exceeds the buffer limits, as discussed earlier. The signals from the first limiter 54 and the second limiter 56 are processed along with other signals, by the multiplication shift logic 50 and the modulus-reduction shift logic 52.

The first counter 58 in FIG. 12 counts the variable m (see FIG. 6b), which represents the number of bits of the multiplier in register 12 which are yet to be processed. The second counter 60 contains the variable n (see FIGS. 6b and 5), which represents the number of bits by which register 18 (register N) has been shifted into the buffer.

Figure 8:
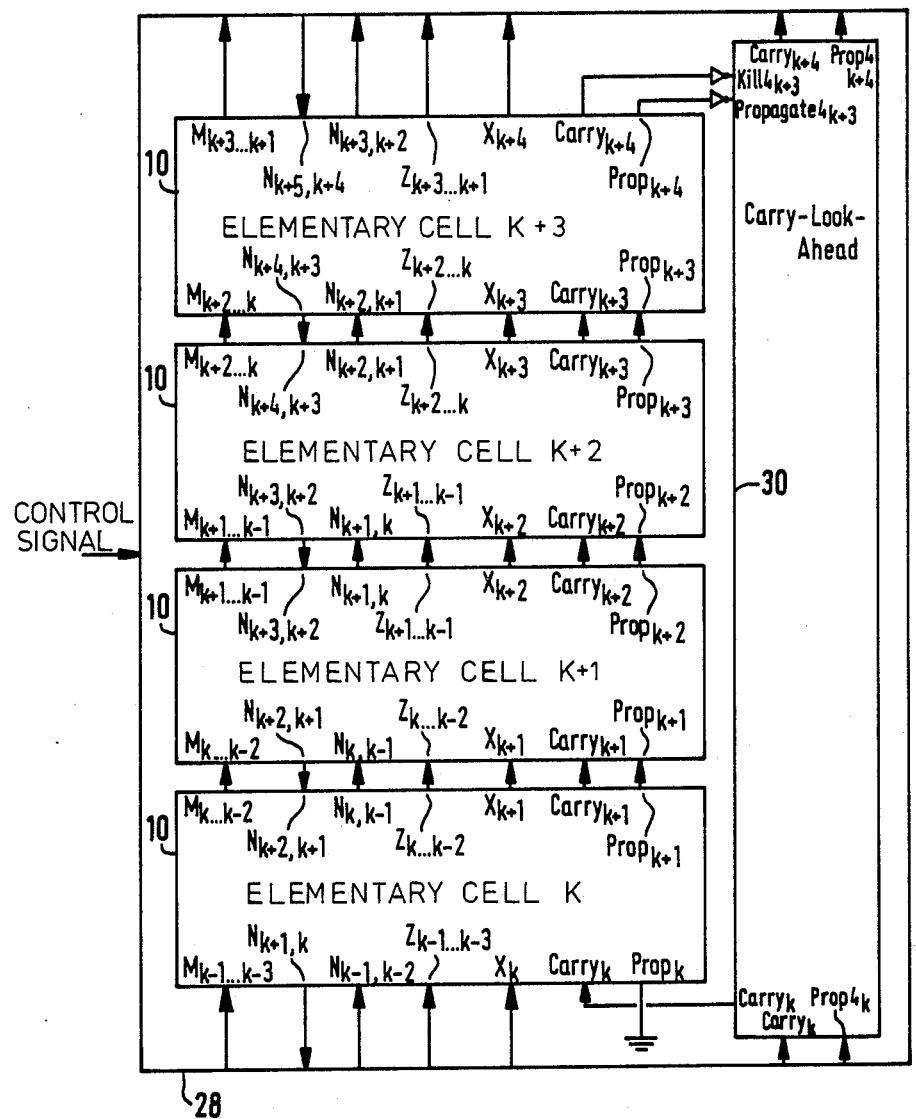
FIG. 8 shows the combination of four elementary cells according to FIG. 7, to form a 4-cell block with a hierarchical carry-look-ahead (CLA) element.
Figure 9:
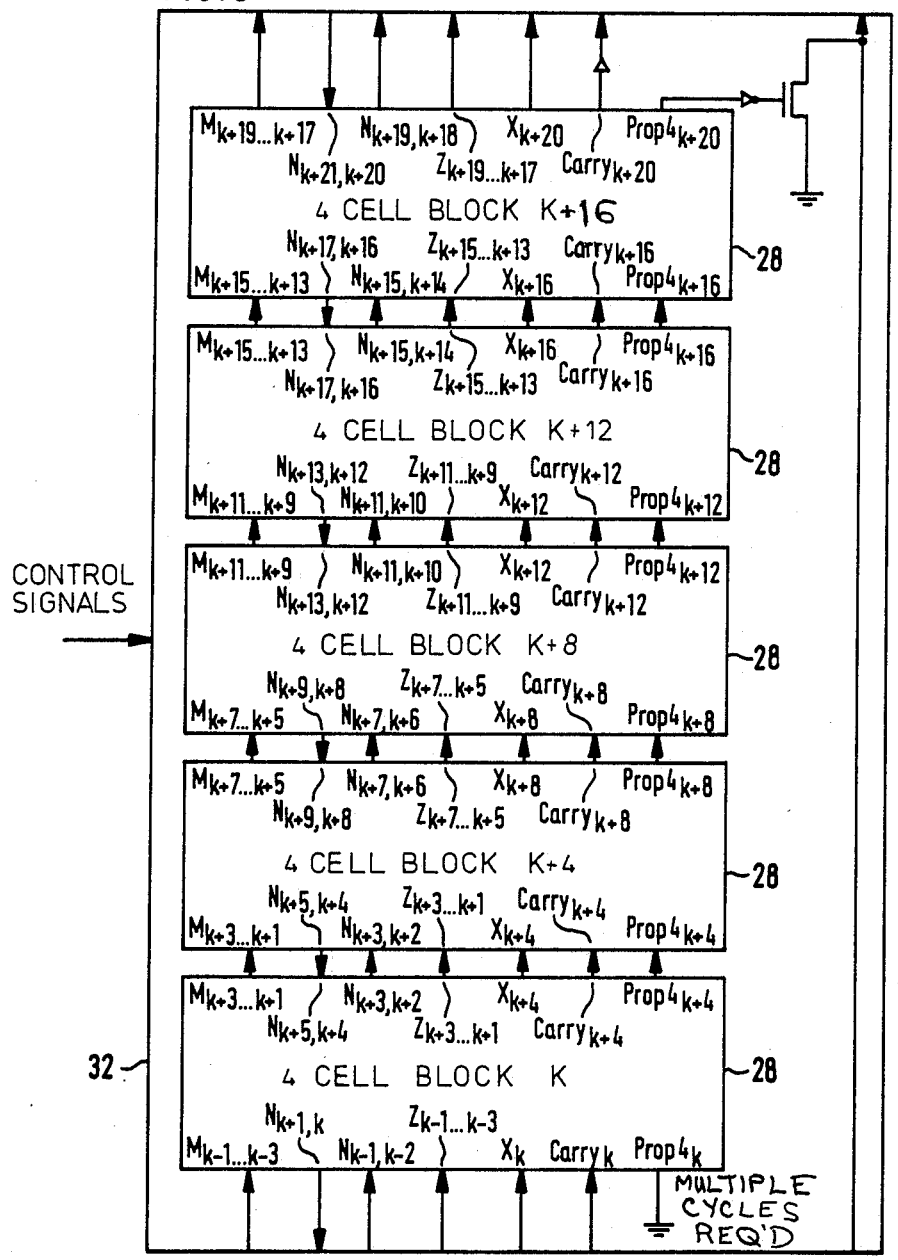
FIG. 9 shows the hierarchical combination of five 4-cell blocks according to FIG. 8 to form a 20-cell block.
Figure 10:
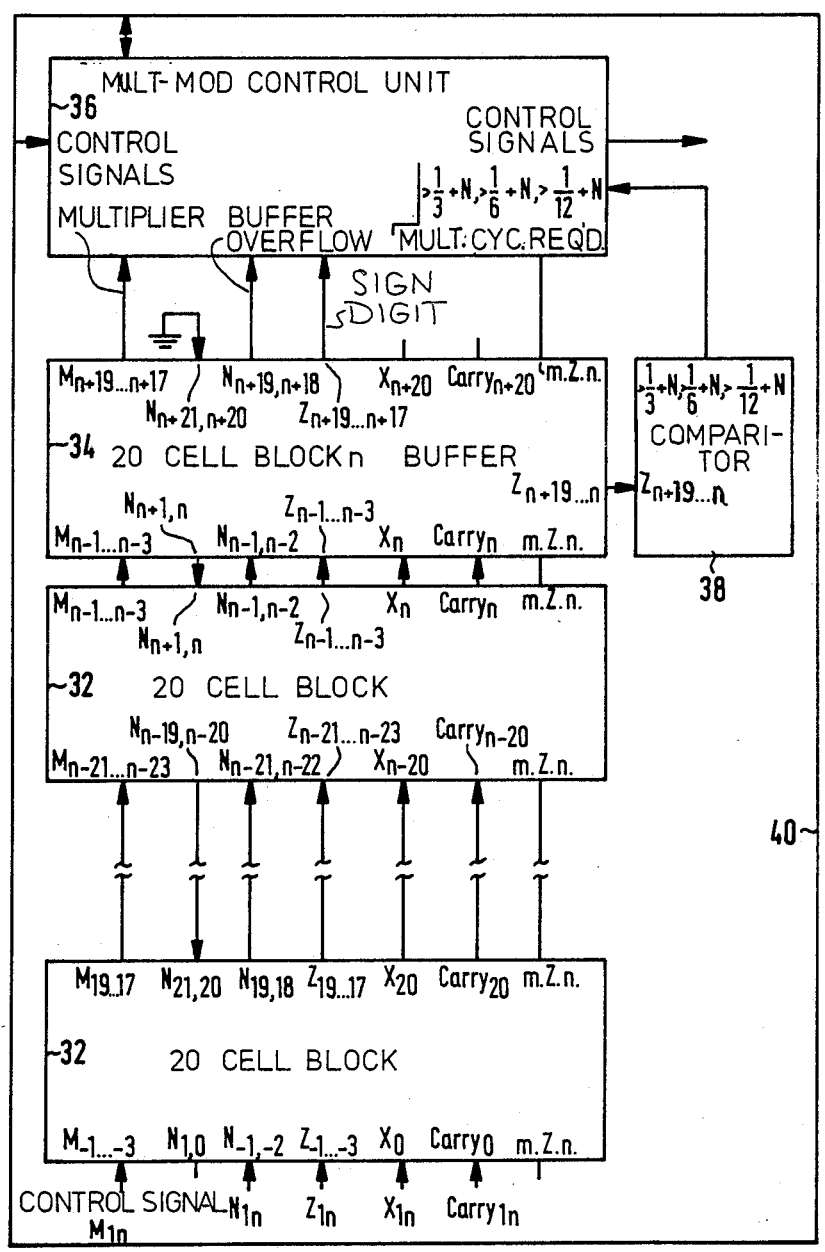
FIG. 10 is a complete encryption unit with a plurality of 20-cell blocks according to FIG. 9, as well as with a control unit.

With the elementary cell 10 having been illustrated in FIG. 7, FIG. 8 shows how a 4-cell block 28 with a hierarchical carry-look-ahead element 30 is constructed in a hierarchical structure comprised of several (i.e., 4) elementary cells 10. FIG. 9 illustrates five 4-cell blocks 28 in an additional stage (i.e., of structure formation), configured to form a 20-cell block 32. And, as shown in FIG. 10, in a further hierarchical structure, a plurality of 20-cell blocks 32, with the topmost such block is in the form of a buffer 34, are aggregated to form an encryption unit 40 with a mult-mod control unit 36.

An elementary cell 10 is configured according to FIG. 7, and cooperates with the mult-mod control unit 36. Cell 10 is capable of handling all steps of the mult-mod loop of FIG. 6b in a single cycle, since it contains a special logic for each step of the loop, such as:
shifting the modulus N by a plurality of bits in register 18;
shifting register Z (registers 20, 22, and 24) by a plurality of bits in barrel shifter 20; and
carrying out the 3-operand addition step by means of the bit adder 22, the full adder 24, and the carry-lookahead unit 26.

The mult-mod control unit 36 (FIG. 12) calculates the parameters for the next cycle, and does so in parallel with the work of elementary cell 10. This completes the description of the conversion of the inventive method into VLSI design of the cryptographic processor.

Figure 13:
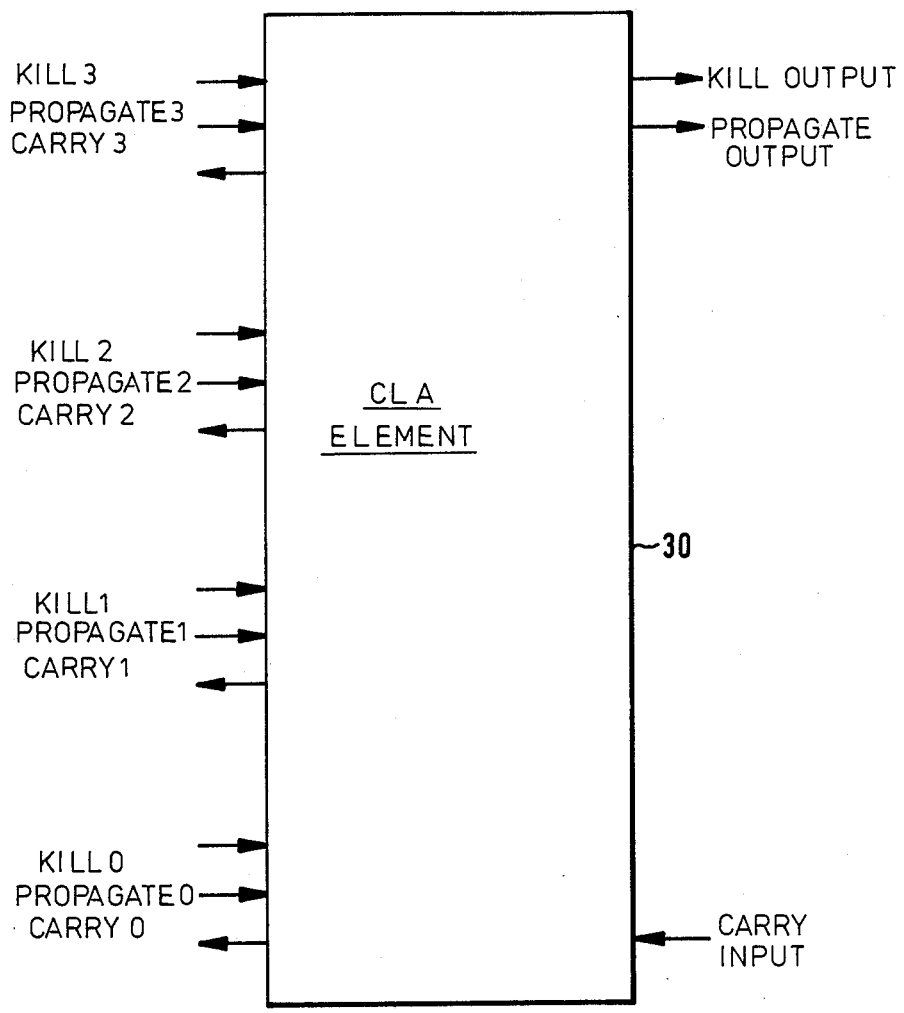
FIG. 13 shows a hierarchical carry-look-ahead (CLA) element as comes to be used with the 4-cell blocks according to FIG. 8.
Figure 14:
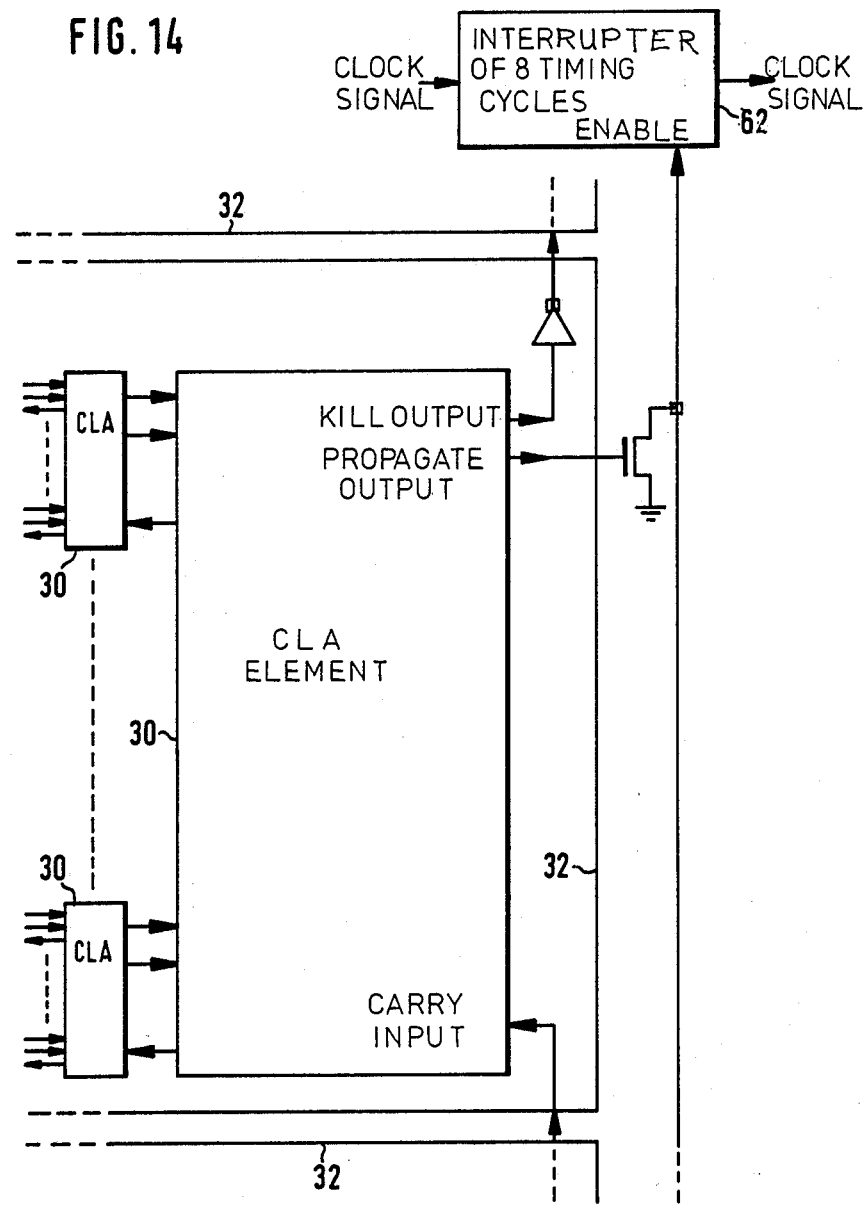
FIG. 14 shows the connections of the CLA element according to FIG. 13, within the hierarchy of the 20-cell blocks.

According to FIGS. 13 and 14, a CLA element 30 has been developed which determines whether carry bits will be influential over larger distances. Since this is the case in the cryptographic processor according to the invention, for only one time out of 30,000, the cycle time of the addition logic is no longer determined by the duration of the longest addition time (where the lowest-valued carry bit affects the highest-valued carry bit) but by the mean addition time.

The CLA element 30 has a hierarchical structure. It processes the CLA signals of the subordinate stage (left side) and generates a CLA signal for the superordinate stage (right side).

A propagate signal for a position signifies that the carry for this position is determined by the carry from the next lower position. If all the propagate signals are activated, the hierarchical CLA element 30 generates the "propagate" output signal for this element. A kill signal signifies that this position has no carry. The "kill" output signal (for the element 30) is activated if it can be decided in the subordinate elements that the highest-valued position of this element has no carry.

The CLA elements 30 can be aggregated into a tree structure, by an aggregation principle or technique. In such a structure, each of them represents a larger number of carry bits. The advantage of the CLA is that the serial processing of the carry bits is replaced by a parallel-series (tree-like) processing. Thus, there is a substantial savings in addition time.

With each additional stage required, the length of the signal path is multiplied, so that beyond a certain tree height the combination of neighboring trees is no longer beneficial. The carry is then processed serially with the roots of these trees.

The latter can be seen in FIG. 14, which shows the connection of the CLA elements 30 in combination with an interrupter 62. Within a block of 20 bits, the carries are processed by the CLA tree. From block to block, the carry is passed serially.

This concept is slightly expanded in the cryptographic processor 48. The block 'propagate' signal, which has become useless, is used to actuate the interrupter 62, which then suppresses the clock signal for the duration of 8 timing intervals. This is the time required for a carry to be passed through the entire serial block chain.

If the carry from a block is thus determined by the next lower valued block, the block "propagate" signal is automatically activated by the block CLA. The interrupter 62 is switched on, and the block chain has suffi-cient time to correctly perform its internal bit operations or correctly set its level.

The cycle time can therefore be adjusted to be exactly the length necessary to process a carry from immediately neighboring blocks. A huge advantage is afforded by this, since, independently of the number of positions, only the time of a block carry need be taken into account. The calculation time for a 660 bit addition is thus no longer than that for a 20 bit addition In only one out of about 30,000 cases will the carry bits effect more than two blocks. The CLA recognizes this. In such a case the addition requires not one, but eight cycles.

By breaking down the RSA algorithm into elementary operations and converting them into an inventive circuit, the absolute number of steps required to encrypt a message can be calculated. One can directly calculate from this the encryption rate, in general form, "$V_{RSA,gen.}$" expressed in coded bits per second:

$$V_{RSA,allg.} = f \cdot \frac{L(N)}{3/2 \cdot L(N) \cdot \frac{L(N)}{\min(Erw(sz),Erw(sn))} \cdot L(N) \cdot \frac{A}{B}}$$

$$= f \cdot \frac{2}{3} \cdot \frac{\min(Erw(sz),Erw(sn))}{L(N) \cdot \frac{A}{B}} \quad \left[\frac{Bit}{Second}\right].$$

(Here,
"allg." means "general";
"Erw" means "expected value" of its argument;
"min" means "minimum value" of its argument; and
This encryption rate is:
Proportional to the frequency f of the processor;
Proportional to the number of bits, L(N), which are encrypted together [i.e., simultaneously];
Inversely proportional to the number of mult-mod calls, 3/2L(N);
Inversely proportional to the number of additions and subtractions per mult-mod call, L(N)/min(Erw(sz), Erw(sn)); and
Inversely proportional to the number of individual steps into which the addition and subtraction of a large number is broken down, L(N)*A/B, where B is the width of the ALU (arithmetic logic unit) (the wider the ALU is, the fewer operations are needed to add two long numbers), and A is the number of cycles required to carry out an operation.

For the novel cryptographic processor, Erw(sz)=Erw(sn), and A/B=1/L(N), since the data width of the ALU is equal to the length of the data to be encrypted, and the ALU operation requires only one cycle. Accordingly, for the special case of this cryptographic processor, the encryption rate is:

$$V_{RSA,KP} = f_{KP} \cdot \frac{2}{3} \cdot \frac{Erw(sz)}{L(N)} \quad \left[\frac{Bit}{Second}\right]$$

$$f_{KP} \simeq 30 \text{ MHZ}, Erw(sz) \simeq 2,27, L(N) = 660 \text{ Bits} \simeq$$

$$V_{RSA,KP} \simeq 68,7 \quad \left[\frac{kBit}{Second}\right].$$

(where "KP" stands for "the inventive cryptographic processor").

The frequency of 30 MHz comes from an extrapolation of a cycle time of 100 ns which is attainable in 5-micron NMOS technology (a laboratory test prototype in 5-micron NMOS technology comprised about 5,000 transistors), to presently available 2-micron CMOS technologies.

The described embodiment of the inventive cryptographic processor is comprised of 80,000 transistors, in 2-micron CMOS technology. The chip surface area is 5.2 mm×5.2 mm. With the maximum key length of 660 bits, it encrypts and decrypts data, even in the most unfavorable case, at the high rate of 64 kbit/sec.

Figure 16:
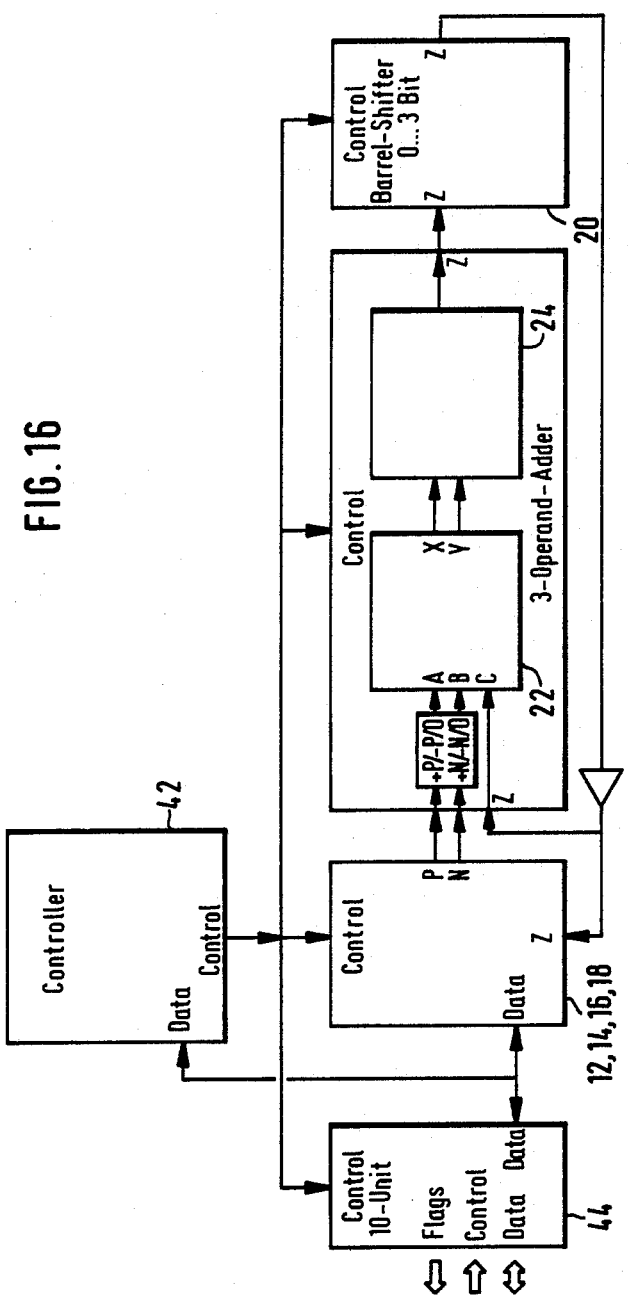
FIG. 16 is a schematic block diagram representing the information flow.
Figure 17:
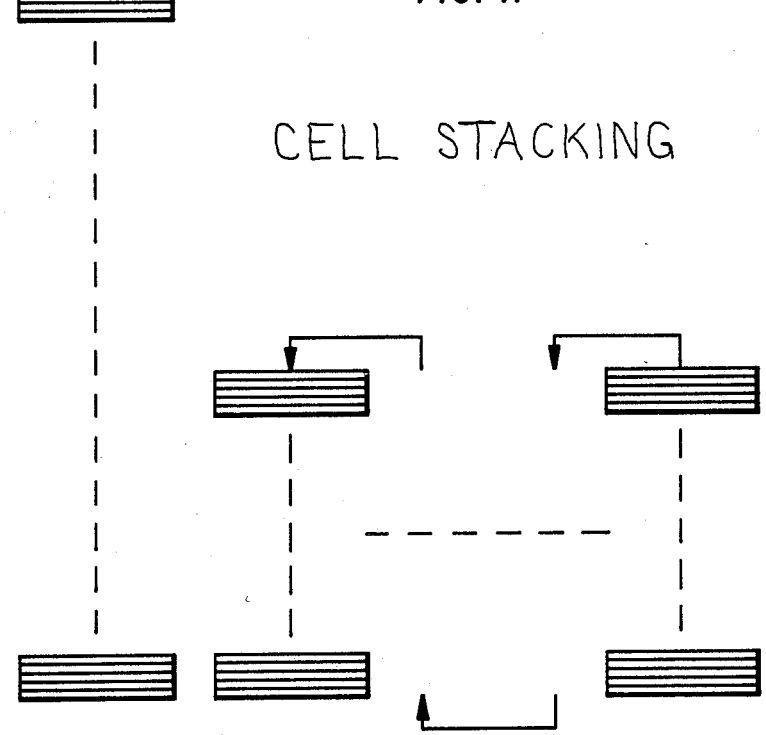
FIG. 17 is a floor plan of the arrangement of elementary cells on a chip.

The logic block structure and floor plan may be seen from FIGS. 16 and 17. FIG. 16 shows the block circuit diagram of the cryptographic processor 48 which can be derived directly from the descriptions of the elementary cell 10 offered supra. In the floor plan concept according to FIG. 17, various basic constraints or "boundary conditions" need to be taken into account:
The structure of elementary cell 10;
The intercommunication of the elementary cells; and
The provision of connections for supplying all necessary control signals to the elementary cells.

Four components of elementary cell 10 exchange information with the corresponding components of neighboring elementary cells. These are:
The UD shift register 18 (see FIG. 7);
The bit adder 22;
The barrel shifter 20; and
The full adder 24. This suggests that the individual components of the elementary cell be stacked or arrayed in a line, so that no additional communications paths to neighboring elementary cells are produced. It follows from the relatively high number of components that the elementary cell of the present embodiment of the processor has a small structural height and a large width.

Although the elementary cell is shallow with a small height and large width, the required stacking of cells results in a narrow, high stack, as seen on the left in FIG. 17. From manufacturing engineering considerations, is is desirable to use square chips to the extent possible. Therefore the high single stack is broken down into shorter separate stacks which are arrayed next to each other (FIG. 17 on the right). Every other such short stack is upside down, since the elementary cells which previously were vertical neighbors at the separation line will then be horizontal neighbors. The necessary information transfer is made to neighboring cells at the tops and bottoms of the respective short stacks.

The units of the processor which units have still not been assigned places (i.e., the places of which have not yet been discussed in the present case), namely the main control unit 42 and the I/O unit 44, require so little space in comparison to the encryption unit 40 that they may be located at any location bordering on unit 40.

While only a few embodiments of the present invention have been shown and described, it will be obvious that many modifications may be made thereof without departing from the spirit and scope of the invention.

What is claimed is:

1. A cryptographic method for utilizing the "public key code" method of Rivest, Shamir, and Adleman ("RSA method"), for enciphering and deciphering messages comprising the steps of:
    selecting two large prime numbers, p and q, and a third large number, E;
    forming by multiplication the product, N=p * q;
    converting the message to be encrypted into a series of elements $P_i$ preferably of equal length and having numerical values less than that of N;
    encrypting these elements $P_i$ by raising each to the power E and subsequently reducing modulus N, to give the numbers $C_i = P_i^E$ modulus N;
    carrying out the above involution step by means of a series of multiplications;
    performing modulus-reduction operation following the series of multiplications, by carrying out a multiplication in the remainder class ring over N;
    carrying out the aforesaid multiplication by breaking down the operation into individual steps, whereby the multiplication is essentially converted to a series of additions; and
    carrying out the aforesaid modulus-reduction as a series of subtractions, according to the classical division algorithm, wherein a first look-ahead technique is used for the division and the multiplication is also carried out with a second look-ahead technique.

2. The cryptographic method according to claim 1, wherein look-ahead.algorithms are used to reduce the maximum necessary number of additions and/or subtractions.

3. The cryptographic method according to claim 2, wherein for said first look-ahead technique for the modulus-reduction operation, is selected such that the probability-theoretical expected value of the number of operations skipped by the use of the first look-ahead technique for the modulus reduction is exactly the same as the probability-theoretical expected value of the number of operations skipped by the use of the second look-ahead technique for the multiplication.

4. The cryptographic method according to claim 3, comprising the step of uncoupling the second look-ahead technique from said first look-ahead technique, whereby each of the two look-ahead techniques generates a shift amount sz or sn, respectively representing the number of bits the intermediate result Z for the multiplication, or the modulus N, respectively, is to be shifted per cycle, wherewith the intermediate result Z being shifted absolutely by sz bits, and wherein modulus N is shifted by sn bits relative to the intermediate result Z.

5. The cryptographic method according to claim 4, wherein the addition and subtraction of the multiplication step and modulus-reduction step, respectively, are combined into a single operation, a 3-operand addition wherein three operands are added per step, as follows:

$$\begin{array}{r} A\ [i] \\ +B\ [i] \\ +C\ [i] \\ \hline S1\quad S0\ =\ 0\ldots 3 \end{array}$$

$$X[\max + 1] \ldots X[i + 1] \ldots X[0] = 0$$

$$Y[\max + 1] = 0 \ldots Y[i] \ldots Y[0],$$

and wherein this 3-operand addition is divided into two segments.

6. The cryptographic method according to claim 5, comprising selecting the first of the two segments such that a sum of the three bits of the operands A, B, and C is formed at each binary position, with the sum $A[i]+B[i]+C[i]$ lying between 0 and 3, said sum being binary and capable of being represented by two bits, S1 and S0, and generating two new numbers X and Y from the two sum bits, as follows:

Y[i]:=The lowest valued bit of the sum A[i]+B[i]+-C[i] [i.e., Y[i]=S0[i]];

Y[max+1]:=0;

X[i+1]:=The highest valued bit of the sum A[i]+-B[i] +C[i] [i.e., X[i+1]=S1[i]]; and

X[0]:=0, where i=0, . . . , max.

7. The cryptographic method according to claim 5, selecting the second segment such that the numbers X and Y are added together in known fashion, with carry, and carrying out the bit addition without carry of the first segment to a point in time at which normal addition logic is prepared for the next cycle by means of a "precharge" signal.

8. The cryptographic method according to claim 7, wherein said addition comprises the steps of:
 (a) breaking down the long, large numbers X and Y into small fragments to be processed in separate blocks (32);
 (b) simultaneously calculating the carry bits within the blocks (32) according to a known carry-look-ahead (CLA) method; and
 (c) passing on the carry bits from a given block to the following block, for the case where the carry bits of neighboring blocks other than the two blocks just mentioned are not thereby affected.

9. The cryptographic method according to claim 8, comprising providing an interrupter (62) which is activatable by the blocks (32), said interrupter, in the case where carry bits have effects beyond neighboring blocks, making the necessary time available for said carry bits to be calculated and processed.

10. A cartographic processor for carrying out the cryptographic method, comprising:
 a sequence of specialized elementary cells (10) for computationally carrying out the individual operations;
 assembled blocks each of which comprises a plurality of elementary cells (10) in stages;
 a tree-like hierarchial carry-look-ahead (CLA) element (30) being associated with each block 28; 32),
 an interupter (62) controlled by the carry-look-ahead (CLA) element (30), for processing the signal coming from CLA element 30, and interrupting the timing signal or clock signal for about 8 cycles so that the time for the addition of two numbers is independent of the length of these numbers, and wherewith within each block, the carry operations are performed in parallel.

11. The cryptographic processor according to claim 10, wherein each of said elementary cells (10) comprise:
 a register (12) for the multiplier M;
 a code register (14);
 a data register (16);
 a UD (up/down) shift register (18) which contains a multiple of the modulus N during the calculation, and which in addition to its storage function has the capability of shifting the modulus N by a plurality of positions in one of the two directions, in a single step;
 a bit adder (22) without carry bit, said bit adder carrying out the first step of the 3-operand addition operation;
 a full adder (24) coupled to said bit adder for adding two numbers obtained in said bit adder (22) and storing the result as an intermediate result Z; and
 a CLA element (26) for calculating a carry bit.

12. The cryptographic processor according to claim 11, wherein the components of said elementary cell operate in parallel.

13. The cryptographic processor according to claim 12, comprising aggregating a plurality of blocks (28) of elementary cells (10) into larger blocks (32), wherewith the carry is passed serially from one block to the next, the CLA elements (30) of the larger blocks (32) comprising a tree-like structure, and wherewith the carry is calculated simultaneously at each superordinate CLA element (30) of a block, so that a signal from the carry calculations can actuate said interrupter (62) which processes the signal coming from the CLA elements (30) and interrupts the timing signal or clock signal for about 8 cycles if a CLA element of a larger block (32) emits a signal.

14. The cryptographic processor according to claim 13, comprising a mult-mod control unit (36) for controlling the functions of said elementary cells (10), wherewith said mult-mod control unit (36) comprising:
 a shift logic (50) for the multiplication;
 a shift logic (52) for the modulus-reduction operation;
 a comparator (38) which compares the topmost bits of the intermediate result Z of said full adder (24) with the topmost bits of $\frac{1}{3}$, 1/6, 1/12, etc. of modulus N, said comparisons being carried out in parallel with each other;
 a first limiter (54) coupled to said shift logic (50) for the multiplication, said limiter limiting the shift amount of intermediate result Z; and
 a second limiter (56), for the modulus-reduction operation, said second limiter limiting the shift amount of said UD shift register (18) when needed; and
 two counters (58, 60), the first of said counters 58 registering the number of bits of register (12) still to be processed, and said second counter (60) registering the position of modulus N in said buffer (34).

15. The cryptographic processor according to claim 14, comprising an elementary block configured as a buffer (34) having a length of about 20 bits, for uncoupling said look-ahead a algorithm for the multiplication from the look-ahead algorithm for the modulus-reduction operation, wherewith N penetrates into said buffer (34) and wherewith said multi-mod control unit (36) ensures, via said limiter (56) that modulus N does not exit either the upper or lower boundary of the buffer.

* * * * *